(12) United States Patent
Fujimoto

(10) Patent No.: US 7,747,039 B2
(45) Date of Patent: Jun. 29, 2010

(54) APPARATUS AND METHOD FOR AUTOMATICALLY DETECTING OBJECTS

(75) Inventor: Kazumi Fujimoto, Yokohama (JP)

(73) Assignee: Nissan Motor Co., Ltd., Yokohama-shi, Kanagawa (JP)

( * ) Notice: Subject to any disclaimer, the term of this patent is extended or adjusted under 35 U.S.C. 154(b) by 161 days.

(21) Appl. No.: 10/575,283

(22) PCT Filed: Nov. 29, 2005

(86) PCT No.: PCT/IB2005/003579

§ 371 (c)(1),
(2), (4) Date: Apr. 11, 2006

(87) PCT Pub. No.: WO2006/059201

PCT Pub. Date: Jun. 8, 2006

(65) Prior Publication Data

US 2008/0273750 A1    Nov. 6, 2008

(30) Foreign Application Priority Data

Nov. 30, 2004 (JP) .............................. 2004-346670
Apr. 21, 2005 (JP) .............................. 2005-123494

(51) Int. Cl.
*G06K 9/00* (2006.01)
*H04N 7/18* (2006.01)

(52) U.S. Cl. ........................ 382/103; 382/107; 382/104; 382/153; 348/148; 348/118; 348/119; 340/436; 340/435; 340/901; 340/904

(58) Field of Classification Search ................. 382/128, 382/103, 104, 153, 107; 348/119, 118, 148; 701/301, 300; 340/436, 435, 901, 904, 937
See application file for complete search history.

(56) References Cited

U.S. PATENT DOCUMENTS

| 4,970,653 | A | 11/1990 | Kenue |
| 6,246,961 | B1 | 6/2001 | Sasaki et al. |
| 6,317,691 | B1 * | 11/2001 | Narayan et al. ............. 701/301 |
| 6,466,684 | B1 * | 10/2002 | Sasaki et al. ................ 382/104 |

(Continued)

FOREIGN PATENT DOCUMENTS

JP    HEI 10-214326    8/1998

OTHER PUBLICATIONS

Andrea Giachetti et al., "The Use of Optical Glow for Road Navigation," IEEE Transactions on Robotics and Automation, IEEE Inc., New York, Feb. 1, 1998, vol. 14, No. 1.

(Continued)

*Primary Examiner*—Wesley Tucker
*Assistant Examiner*—Nancy Bitar
(74) *Attorney, Agent, or Firm*—Young Basile

(57) ABSTRACT

A device automatically detects boundary lines on the road from an image captured by a camera mounted on the vehicle. The device includes a controller that performs image processing on the image to compute the velocity information for each pixel in the image, and, on the basis of the computed velocity information for each pixel in the image, extracts the pixels that contain velocity information, detects the oblique lines formed by the extracted pixels, and detects the boundary lines on the road on the basis of the detected oblique lines.

30 Claims, 13 Drawing Sheets

U.S. PATENT DOCUMENTS

| | | | |
|---|---|---|---|
| 6,477,260 B1* | 11/2002 | Shimomura | 382/106 |
| 6,590,521 B1* | 7/2003 | Saka et al. | 342/70 |
| 6,944,543 B2* | 9/2005 | Prakah-Asante et al. | 701/301 |
| 7,091,838 B2* | 8/2006 | Shimakage | 340/436 |
| 7,218,758 B2* | 5/2007 | Ishii et al. | 382/104 |
| 2004/0183663 A1 | 9/2004 | Shimakage | |
| 2005/0152580 A1* | 7/2005 | Furukawa et al. | 382/103 |
| 2006/0217886 A1* | 9/2006 | Fujimoto | 701/300 |
| 2006/0239509 A1* | 10/2006 | Saito | 382/104 |
| 2007/0127777 A1* | 6/2007 | Fujimoto | 382/104 |

OTHER PUBLICATIONS

Smith, S.M., et al., "ASSET-2: Real-Time Motion Segmentation and Shape Tracking," IEEE Transactions on Pattern Analysis and Machine Intelligence, IEEE Service Center, Los Alamitos, CA, Aug. 1, 1995, vol. 17, No. 8, pp. 814-820.

* cited by examiner

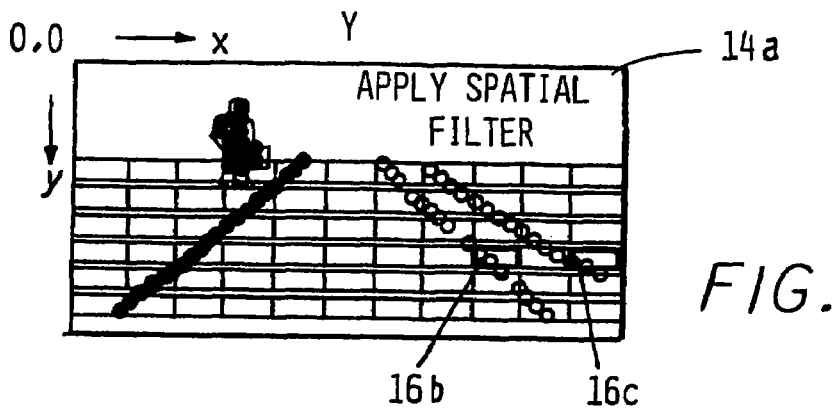
FIG. 16A
IDENTIFIED AS A DOT CANDIDATE WHEN VELOCITY IS DETECTED ABOVE AND/OR BELOW THE DOT, IN THE OBLIQUE DIRECTION
IF A LINE SECTION FORMED BY THREE OR MORE DOT CANDIDATES SATISFIES THE SLOPE CONDITION, IT IS DETECTED AS AN OBLIQUE LINE CANDIDATE
FIG. 16B
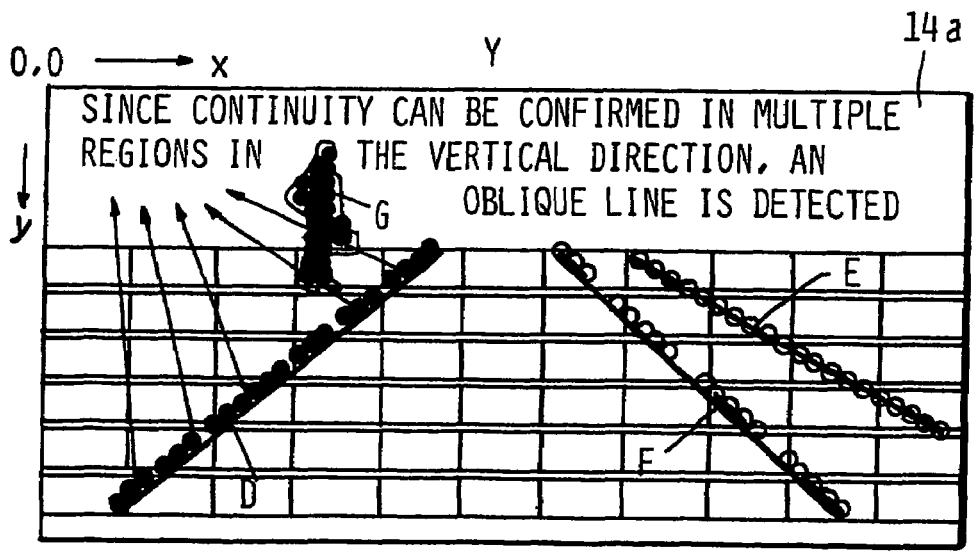
FIG. 17

APPARATUS AND METHOD FOR AUTOMATICALLY DETECTING OBJECTS

BACKGROUND

The present invention pertains to the technical field of object detection, and in particular to techniques for detecting any moving object in front of a vehicle.

Japanese Kokai Patent Application No. Hei 10[1998]-214326 discloses an automatic guidance system that uses Hough transformation to detect road edges from images in front of a vehicle. A string of detected edges is arranged side-by-side on a straight line and is subjected to Hough transformation to detect the road edges. For the Hough transformation, as the points that form the road edges are detected, curves are drawn in the parameter space, and the accumulated values of the points on the curves have to be added. This processing may be performed for all of the points that form the road edges, in which case the processing load is heavy. It would be desirable to provide an less computationally-intensive technique to detect road edges or other boundary lines in the path of a vehicle.

SUMMARY

In accordance with one aspect of the invention, an apparatus is provided for detecting objects in one or more images captured by an image pickup device mounted on a vehicle. The apparatus includes a memory on which is stored pixels of at least one image captured by the image pickup device; and a controller operatively coupled to the memory. The controller is adapted to compute velocity information for each pixel in the image; extract those pixels having a velocity component based on the velocity information; detect oblique lines composed of those extracted pixels having a velocity component, and generate a signal indicative of the road edge in the image based on the oblique lines.

In accordance with another aspect of the invention, a method is provided for detecting objects in an image captured from in front of a vehicle. The method includes processing the image to compute velocity information for each pixel in the image; extracting pixels having a velocity component on the basis of the velocity information of the pixels of the images computed by the velocity information computing means; detecting oblique lines made of pixels having a velocity component and extracted by the pixel extracting means; and detecting the boundary line on the road present in the image in front of the vehicle on the basis of the oblique line detected by the oblique line detecting means.

BRIEF DESCRIPTION OF THE DRAWINGS

The description herein makes reference to the accompanying drawings wherein like reference numerals refer to like parts throughout the several views, and wherein:

FIG. 16A is a diagram of the image shown in FIG. 13, illustrating the detection of candidates for oblique lines and the application of a spatial filter;

FIG. 16B is a chart showing the identification of an oblique line candidate in accordance with the second embodiment of the invention;

FIG. 17 is a diagram of the image shown in FIG. 13, illustrating the detection of boundary lines on the road;

DETAILED DESCRIPTION

First Embodiment

Figure 1:
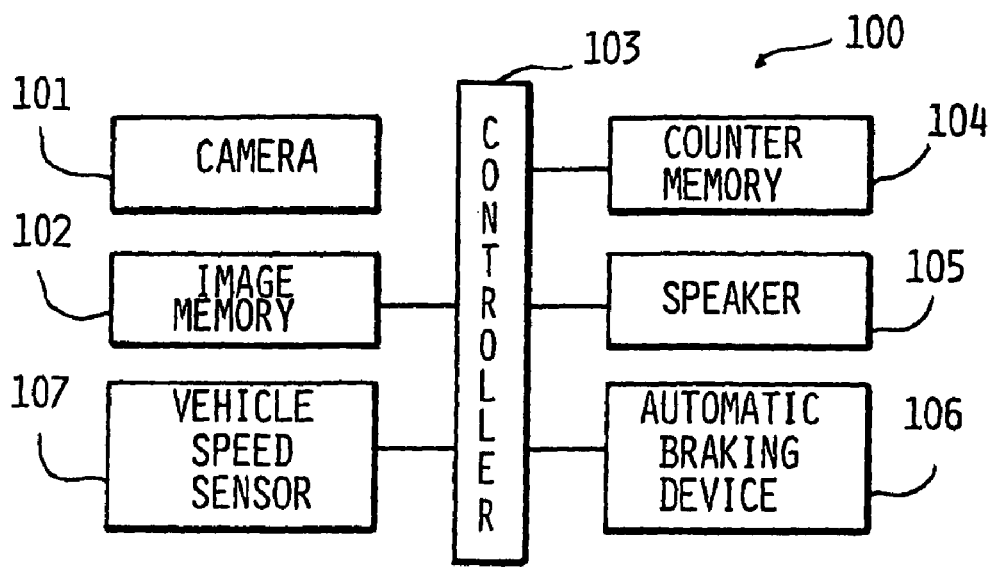
FIG. 1 is a block diagram of an object detection device in accordance with a first embodiment of the invention.

FIG. 1 is a block diagram illustrating an object detection device in accordance with a first embodiment of the present invention. Object detecting device 100 is mounted on the vehicle. It has the following parts: camera 101, image memory 102 that stores the images taken with the camera 101, controller 103 that executes image processing of the images taken with camera 101 and stored in image memory 102, counter memory 104 that stores the count value of the pixel counter to be explained later, speaker 105 that outputs sounds, automatic braking device 106 that controls the vehicle brakes, and vehicle speed sensor 107 that detects the speed of the vehicle.

Figure 2A:
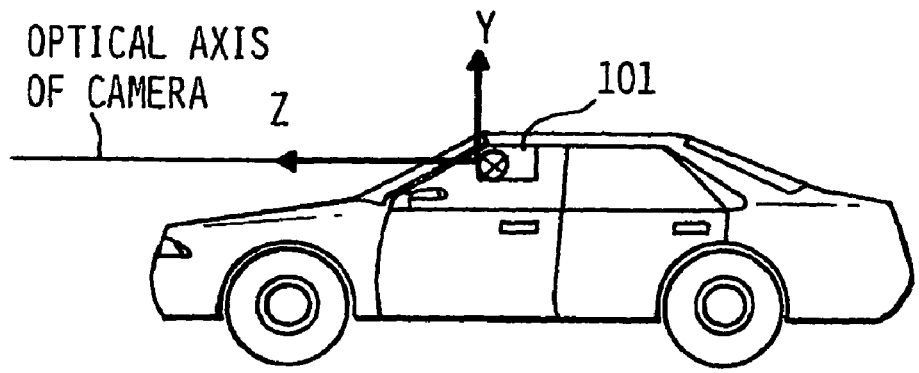
FIG. 2A is a side elevation of a vehicle in which the device of FIG. 1 has been installed, including a camera.
Figure 2B:
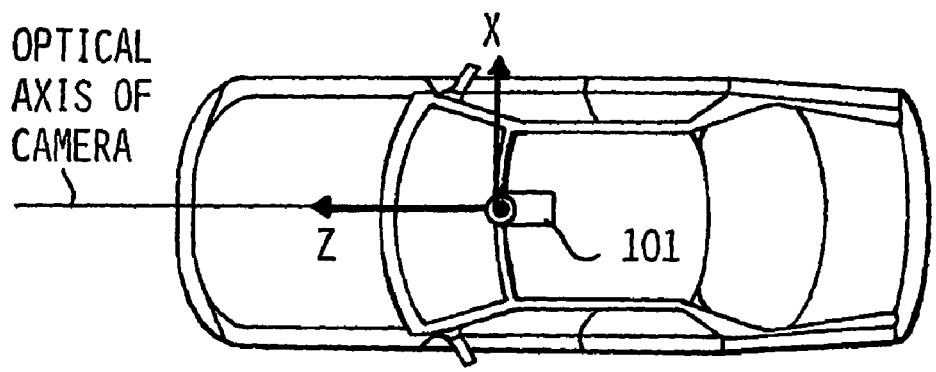
FIG. 2B is a top plan view of the vehicle shown in FIG. 2A.

Camera 101 is a high speed camera having CCD, CMOS or other image pickup elements, and it can take consecutive images of objects from ahead of the vehicle. The image frames are output to image memory 102. The camera 101 is arranged on the upper front portion of the vehicle, as shown in FIGS. 2A and 2B. Its sight of view axial direction Z is in front of the vehicle. It is set such that horizontal axis X of the imaging area is parallel to the ground surface, and vertical axis Y of the imaging area is perpendicular to the ground surface. The images taken by camera 101 are consecutively output and stored in image memory 102.

Figure 3:
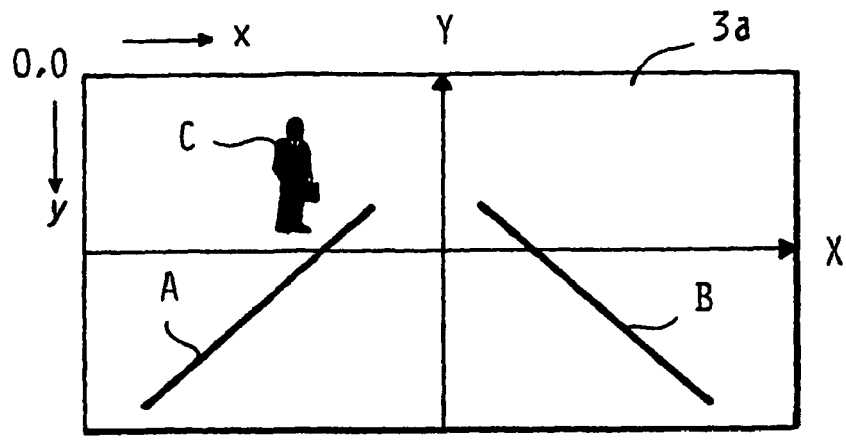
FIG. 3 is a diagram of an image captured by the camera shown in FIG. 2A.

FIG. 3 is a diagram illustrating an example of the image taken with camera 101. Image 3a is taken with camera 101 in an xy coordinate system (camera coordinates) with the origin at the upper-left portion of the image, and with the X-axis defined from left to right and Y-axis defined from upper to lower. In FIG. 3, image 3a includes road edges A and B formed as edge bumps, white lines or guard rails or the like positioned on the left/right sides of the road, and pedestrian C present in front of the vehicle.

Controller 103 processes image 3a stored in image memory 102, as will be explained later, detects the object present ahead of the vehicle, and when there is a danger of collision of the vehicle with the object present ahead of the vehicle, it outputs an alarm (alarm sound) to the driver by means of speaker 105, and automatic braking device 106 is controlled to automatically brake or stop the vehicle. When the object present ahead of the vehicle is detected, first of all, the movement velocity in the lateral direction (horizontal direction) of the object present in image 3a is detected, and a velocity image is formed, with the movement direction and movement velocity in the lateral direction of the object in image 3a displayed in graduated values.

That is, the image taken with camera 101 is read from image memory 102, and the edges of the object present in image 3a are extracted by means of transformation to binary values with a prescribed threshold. For each extracted edge in the image, finer line processing is performed to determine the center of the edge correctly. The edge in fine line form is then expanded so that the edge has a prescribed width, such as that corresponding to 3 pixels. By normalizing the extracted edge, it is possible to obtain an edge image with a uniform width of the edges.

Figure 4A:
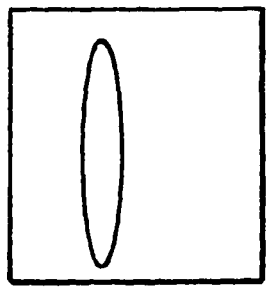
FIG. 4A shows an image in which an edge in a stored image has been extracted.
Figure 4B:
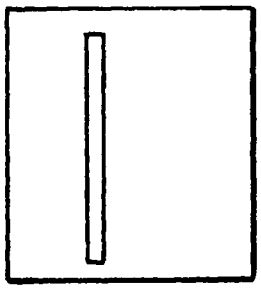
FIG. 4B shows the image of FIG. 4A after it has been subjected to a line-thinning process.
Figure 4C:
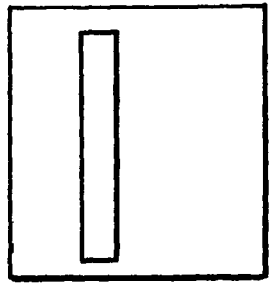
FIG. 4C shows the image of FIG. 4B after it has been expanded to a fixed width.

FIGS. 4A-4C are diagrams illustrating an example of the processing performed to normalize the extracted edges to obtain an edge image. As shown in FIG. 4A, the obtained edge in binary form is subjected to finer line processing to obtain an edge in a finer line form, as shown in FIG. 4B. The edge in finer line form is then expanded to have a constant edge width as shown in FIG. 4C.

The count value of the pixel counter corresponding to the pixels with an edge present in them in the current edge image is then refreshed in the pixel counter stored in counter memory 104. The pixel counter is a counter corresponding to the pixels of the edge image; the count value of the pixel counter corresponding to a pixel where an edge is present is incremented by 1, and the count value of the pixel counter corresponding to a pixel where the edge is absent is initialized to 0. The refreshing processing of the count value is carried out for each of the frames taken consecutively with camera 101. As a result, the pixels with a longer edge presence time have a larger count value, and the pixels with a shorter edge presence time have a smaller count value.

In the edge image, the difference in count values of the pixel counter for pixels adjacent to each other in the lateral direction is taken so that the difference in edge presence time is computed at each pixel, and the time needed to move the edge by 1 pixel is obtained. Then, obtaining the reciprocal of this value enables computing the velocity in the lateral direction in the image space for each pixel. The velocity in the lateral direction in the image space at each pixel corresponds to the movement velocity in the lateral direction of the edge contained in each pixel. As a result, it is possible to compute the velocity component of the edge in each pixel of the image, that is, the movement direction and movement velocity of the edge.

Figure 5:
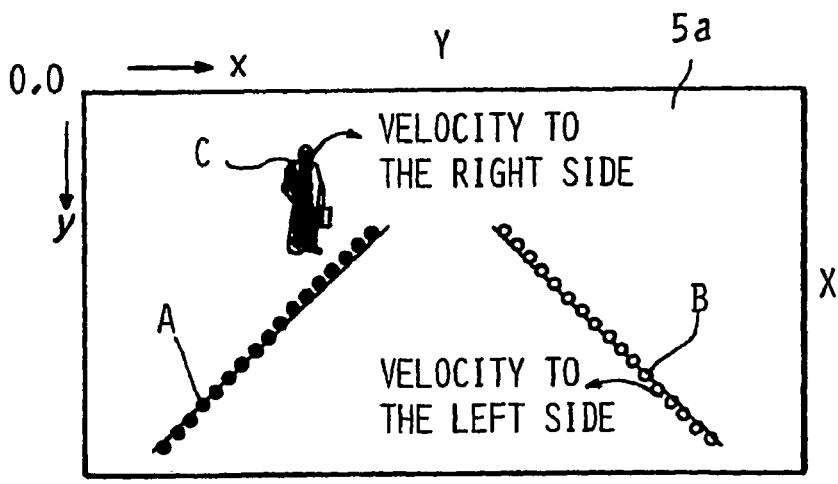
FIG. 5 is a diagram of an image captured by the camera shown in FIG. 2A, including a depiction of a velocity image.

A velocity image is formed, with the velocity component of the object present in image 3a computed in the processing represented by the prescribed grade value. As shown in velocity image 5a in FIG. 5, as the grade value of the velocity component in the velocity image in this embodiment, the pixels for which the velocity has been detected are represented by round dots, with higher movement velocities being represented by larger dots. Also, the velocity towards the right side is represented by solid dots, while the velocity towards the left side is represented by circles. That is, as shown in FIG. 5, a velocity from road edge B on the right hand side of the road to the left hand side of the image is detected, and the velocity to the right hand side of the image is detected from road edge A on the left hand side of the road and from pedestrian C. Also, it is possible to judge from the size of the dots that the movement velocity detected for pedestrian C is higher than that detected for road edges A and B.

Figure 6:
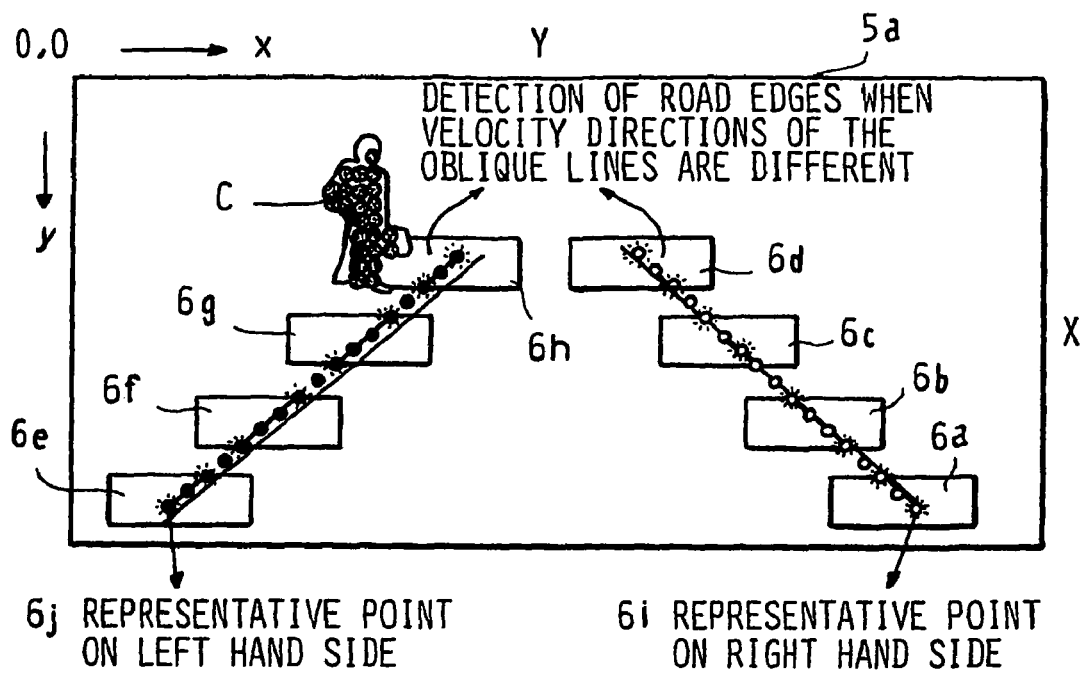
FIG. 6 is a diagram of an image captured by the camera shown in FIG. 2A, including a road edge detecting region that is established in the velocity image.

A region for detecting the boundary line is then established for detecting the road edge or other boundary line on the road on computed velocity image 5a. When the images of the scene from ahead of the vehicle are taken while the vehicle is running, the position where the road edge is present as the boundary line on the road on velocity image 5a is predicted, and a region with a prescribed size is set at that position. For example, as shown in FIG. 6, regions 6a-6h for detecting the boundary line are symmetrically arranged left/right so that the road edges present in velocity image 5a can be detected. A judgment is then made as to whether oblique lines having a velocity component exist in the regions 6a-6h for detecting the boundary line. That is, a judgment is then made as to whether pixels having a velocity component are obliquely arranged side-by-side in the regions 6a-6h for detecting the boundary line.

Then, for example, assuming that oblique lines detected in regions 6d and 6h for detecting the boundary line are detected as a left/right pair, if the detected oblique lines have velocity components in different directions, it is judged that the oblique lines detected in the regions 6a-6h for detecting the boundary line are road edges. That is, when the oblique lines detected in the regions 6d and 6h for detecting the boundary line have velocity components in different directions, it is judged that the oblique lines in regions 6d and 6h for detecting the boundary line are road edges.

The start point and the end point, etc., are extracted from the oblique lines, detected as road edges in the regions for detecting the boundary line, as the representative points. For example, representative point 6i is extracted from region 6a for detecting the boundary line, and left representative point 6j is extracted from region 6e for detecting the boundary line. Double regression analysis is carried out on the basis of the extracted representative points, and the equation of the oblique lines in the XY coordinate system is derived. As a result, the two-dimensional road model represented by Equation (1), that is, the imaged road model, is obtained.

$$x = a1 \cdot y^2 + b1 \cdot y + c1 \quad (1)$$

Figure 7:
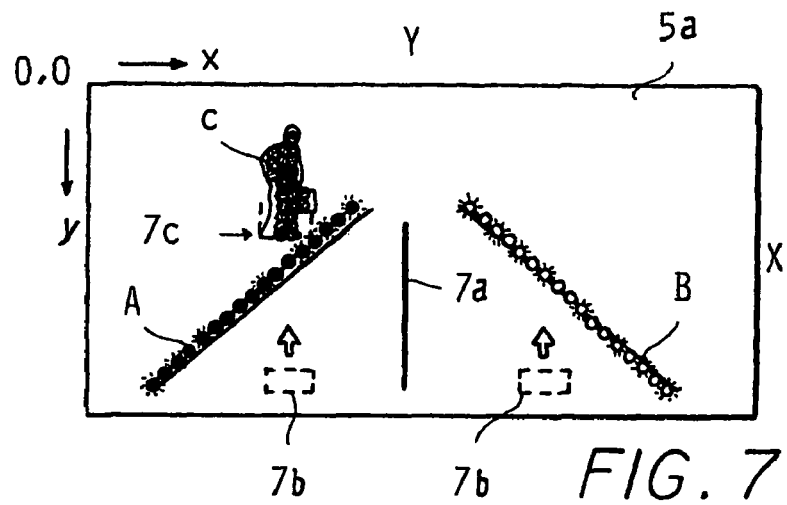
FIG. 7 is a diagram of the image shown in FIG. 6, illustrating the extraction of the pixels having a velocity component towards the center of the two-dimensional road model.

As shown in FIG. 7, center 7a of the two-dimensional road model corresponding to the predicted movement path of the vehicle is computed.

Then, as will be explained later, pixels having a velocity component toward center 7a of the two-dimensional road model are extracted. Among the extracted pixels, pixels having the same velocity component are grouped and are detected as an individual object. First of all, as shown in FIG. 7, a region in the velocity image covering a prescribed range, such as a region of 1 pixel in the longitudinal direction and 3 pixels in the lateral direction, is established as small region 7b for detecting the lower end, and the small region 7b for detecting the lower end is scanned in the velocity image from the lower side upward in the Y-axis direction. The points where two or more pixels in small region 7b for detecting the lower end are present (distributed) with the same velocity component towards center 7a of the two-dimensional road model are then detected. At that time, pixels positioned at the lower end of the small region 7b for detecting the lower end are detected as object lower end position 7c.

The histogram of the velocity image is then computed from object lower end position 7c in the Y-axis direction. That is, the histogram that represents the distribution of number of degrees in the X-axis direction of the pixels having the same velocity component towards center 7a of the two-dimensional road model and present from object lower end position 7c in the Y-axis direction is computed. Assuming the coordinate of the object lower end position 7c is $y_d$ and the degree number of the pixels having the same velocity component towards center 7a in the two-dimensional road model in the Y coordinate value is $V(y_i)$, the sum of the degree numbers in the range of the preset standard height $y_m$ of pedestrian C is computed using following Equation (2).

$$\sum_{i=m}^{d} V(y_i) > T1 \quad (2)$$

Figure 8:
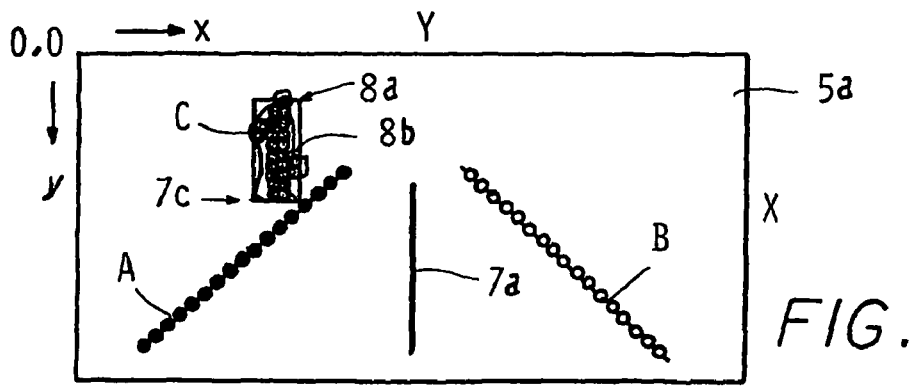
FIG. 8 is a diagram of the image shown in FIG. 6, illustrating the detection of an object field containing a pedestrian moving towards center of the two-dimensional road model, by grouping the pixels having the same velocity component towards center in the two-dimensional road model in the velocity image.

When the sum of the degree numbers computed using Equation (2) exceeds a prescribed value T1, it is judged that there exists an object moving towards center 7a of the two-dimensional road model in the range where the pixels having a velocity component towards center 7a of the two-dimensional road model are distributed. When it is judged that there exists a moving object at the position higher than preset standard height $y_m$ of pedestrian C, the position right before degree number $V(y_i)$ having the velocity component towards center 7a of the two-dimensional road model in the y-coordinate value is less than prescribed value T2, such as the position indicated by portion 8a in FIG. 8, is detected as the upper end position where the moving object is present, that is, object upper end position 8a.

In addition, for the region between object lower end position 7c and object upper end position 8a, a straight line is drawn parallel to the Y-axis and passing through the outermost pixel of the pixels having the same velocity component towards center 7a of the two-dimensional road model and present continuously in the X-axis direction. The region defined by the straight line parallel to the Y-axis as well as object lower end position 7c and object upper end position 8a is defined as region 8b where the moving object is present (object presence range). As a result, the pixels in velocity image 5a having the same velocity component towards center 7a of the two-dimensional road model are grouped, and it is possible to detect object presence range 8b including pedestrian C that moves towards center 7a from the side in the two-dimensional road model.

In velocity image 5a detected in the processing, the positions of road edges A, B and object presence range 8b are transformed to positions in real space. In this embodiment, the pitching generated by running of the vehicle itself is taken into consideration, and it is transformed into the position in real space, as will be explained later.

Figure 9:
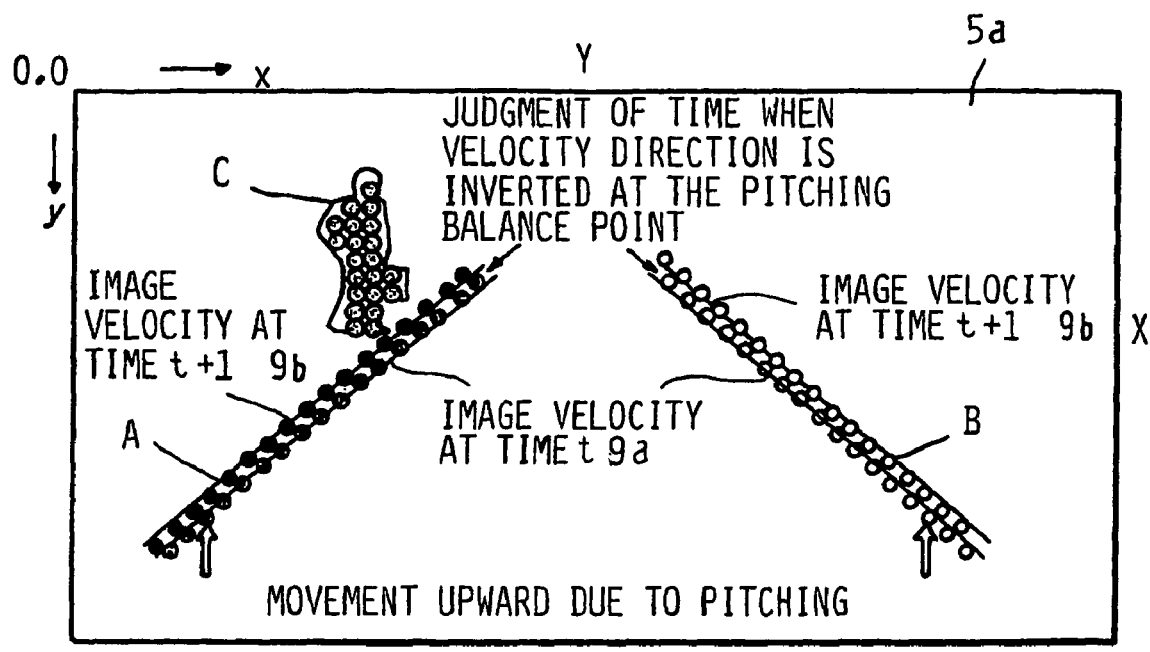
FIG. 9 is a diagram of the image shown in FIG. 6, illustrating the direction of movement of the oblique lines in the velocity image when pitching takes place.

For example, during the movement downward, that is, in the sinking direction due to pitching of the vehicle itself, the line of sight orientation of camera 101 is downward with respect to that with horizontal road surface as shown in FIG. 2A. Consequently, in this case, as shown in FIG. 9, movement takes place in velocity image 5a upward from the position of road edges A and B at time t (9a) to the position of road edges A and B at time t+1 (9b). Consequently, for the oblique line showing road edge A, the velocity component of movement to the right side in velocity image 5a is detected, and, for road edge B, the velocity component of movement to the left side in velocity image 5a is detected.

On the other hand, when the vehicle itself moves upward, that is, in the floating direction due to pitching, the line of sight orientation of camera 101 is upward from that when the road surface is horizontal as shown in FIG. 2A, and in conjunction with this pitching, the position of road edges A and B on velocity image 5a moves downward. As a result, for the oblique line that indicates road edge A, the velocity component of movement to the left side in velocity image 5a is detected, and, for the oblique line indicating road edge B, the velocity component of movement to the right side in velocity image 5a is detected.

Taking into consideration the feature, a judgment is made that the point of change in the velocity direction of the oblique lines indicating road edges A and B in the image of the oblique lines is the pitching balance point, that is, the line of sight orientation of camera 101 is horizontal with respect to the road surface. Since the line of sight orientation of camera 101 is parallel to the road surface in velocity image 5a at the pitching balance point, as explained above, it is possible to compute the three-dimensional coordinates of the representative points by means of triangulation based on the coordinates of the representative points arbitrarily set on road edges A and B, and on the camera parameters of camera 101.

Figure 10:
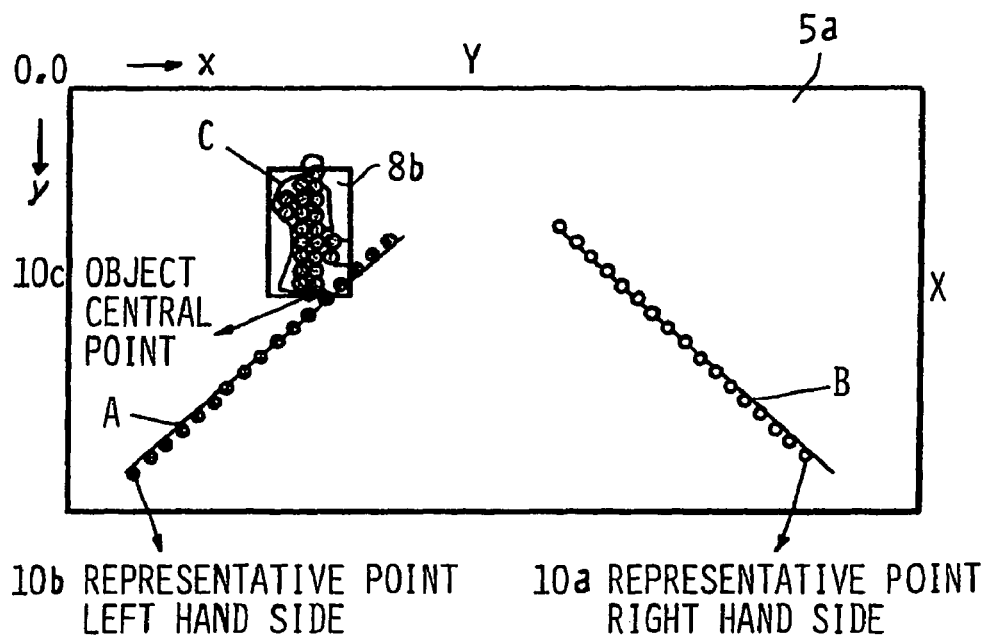
FIG. 10 is a diagram of the image shown in FIG. 6, illustrating the transformation of a two-dimensional road model into a three-dimensional road model.

Consequently, as shown in FIG. 10, any representative points 10a and 10b are set on road edges A and B in velocity image 5a, and based on the coordinates of the representative points and the camera parameters of camera 101, the three-dimensional coordinates of the representative points can be computed by means of triangulation. Based on the three-dimensional coordinates of the representative points, the positions of the oblique lines indicating road edges A and B are transformed to positions in real space, and the three-dimensional road model, that is, the real space road model, is computed. As a result, it is possible to transform the positions of road edges A and B represented by the two-dimensional road model to positions in a three-dimensional road model.

Also, the position of pedestrian C contained in object presence range 8b in real space is computed based on the coordinates of object central point 10c established in object presence range 8b in velocity image 5a, and on the camera parameters of camera 101. As a result, it is possible to transform the position of pedestrian C in velocity image 5a to the position in real space. Also, based on the relative positional relationships among road edges A and B and pedestrian C in real space, the distance from the vehicle itself to pedestrian C and the distance from pedestrian C to the road edge are computed. Also, the distance from the vehicle itself to pedestrian C is not the linear distance from the vehicle itself to pedestrian C. Instead, it is the distance between the position on the vehicle line corresponding to the position of pedestrian C and the position of the vehicle itself.

On the other hand, because the line of sight orientation of camera 101 is not parallel to the road surface, in velocity image 5a not at the pitching balance point as explained above, the positions of road edges A and B and pedestrian C transformed to velocity image 5a at the pitching balance point and the image pickup time interval between velocity image 5a at the pitching balance point, and the current velocity image 5a, enable the positions in real space to be estimated. Then, based on the relative positional relationships among the estimated positions of road edges A and B and pedestrian C in real space, the distance between the vehicle itself and pedestrian C and the distance between pedestrian C and the road edge are estimated.

Based on the relative positional relationships among road edges A and B and pedestrian C, the degree of collision danger between the vehicle itself and pedestrian C is judged using the following three levels 1-3.

Figure 11:
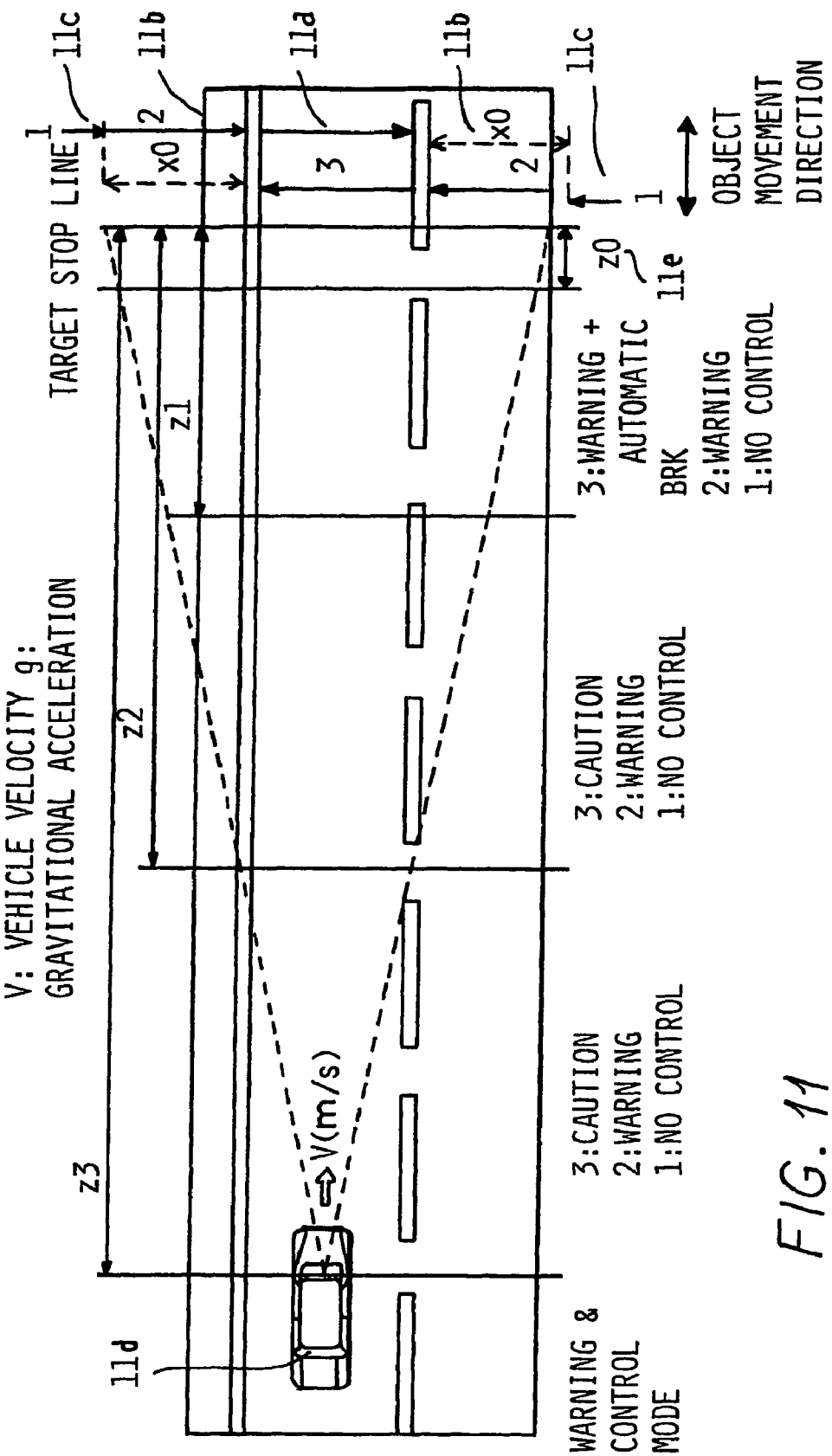
FIG. 11 is a diagram of the relative positional relationships among the vehicle shown in FIG. 2A, the road edges and the object detected in real space.

(1) Level 3. When it is judged that the degree of collision danger between the vehicle and pedestrian C is the highest from the relative position relationships between the road edges and pedestrian C, the degree of collision danger is taken to be level 3. That is, as shown in FIG. 11, when pedestrian C moves inside the road edge present on the left/right sides indicated by portion 11a, that is, when the pedestrian moves inside the vehicle lines where vehicle 11d is itself running, the degree of collision danger between vehicle 11d and pedestrian C is judged to be at level 3.

(2) Level 2. When it is judged that the degree of collision danger between the vehicle and pedestrian C is not as high as level 3 yet there is still the danger of collision from the relative position relationships between the road edges and pedestrian C, the degree of collision danger is taken to be level 2. In other words, when pedestrian C moves in the range indicated by portion 11b, that is, when the pedestrian moves from outside the road edge in a range where the distance from the road edge to pedestrian C is x0 (m) or less, the degree of collision danger between vehicle 11d and pedestrian C is judged to be at level 2. The distance of x0 (m) is computed from the movement velocity of pedestrian C detected in the processing, the distance between vehicle 11d and pedestrian C, and the vehicle speed detected with vehicle speed sensor 107.

(3) Level 1. When it is judged that there is no collision danger between the vehicle itself and pedestrian C, the degree of collision danger for pedestrian C is taken to be level 1. In other words, when pedestrian C moves in the range indicated by portion 11c, that is, when the pedestrian moves out beyond the range of x0 (m) from the road edge, the degree of collision danger between vehicle 11d and pedestrian C is judged to be at level 1. When the judgment result of the degree of collision danger is level 1, there is no need to perform vehicle control to avoid collision, to be explained later, because there is no danger of collision between the vehicle and pedestrian C.

Because the degree of collision danger changes depending on the distance from the vehicle to pedestrian C, the distance from the vehicle to pedestrian C is classified according to the distance computed using the following Equations (3)-(5). Based on the classification result, as will be explained later, vehicle control is performed, as will also be explained later, to avoid collision of the vehicle with pedestrian C. In following Equations (3)-(5), V represents the speed of the vehicle 11d, g represents the gravitational acceleration, and z0 represents the distance 11e from the position on the vehicle line corresponding to the position of pedestrian C and the target stop line.

$$z3=(1/2)*(V^2*0.5\ g)+V*2+z0 \quad (3)$$

$$z2=(1/2)*(V^2*0.5\ g)+V*1+z0 \quad (4)$$

$$z1=(1/2)*(V^2*0.6\ g)+z0 \quad (5)$$

Based on the degree of collision danger assessed in the processing and the distance between the vehicle and pedestrian C classified according to Equations (3)-(5), vehicle control is performed to avoid collision between the vehicle and pedestrian C according to the following listed three control modes (A)-(C).

(A) Caution. When the degree of collision danger is level 3, and the distance between the vehicle and pedestrian C is longer than z2 and shorter than z3, the control mode is "Caution." When the control mode is "Caution," a caution alarm is output from speaker 105 to alert the driver to the presence of a moving object ahead of the vehicle with which there is a danger of collision.

(B) Warning. When the degree of collision danger is level 2, or when the degree of collision danger is level 3 and the distance between the vehicle and pedestrian C is shorter than z2, the control mode is "Warning." When the control mode is "Warning," a warning alarm is output from speaker 105 to alert the driver to the presence of a moving object ahead of the vehicle with which there is a high danger of collision. Also, this warning alarm is different from that for "Caution" in control mode (A). For example, the volume for the warning alarm may be higher than that for the caution alarm, or, the caution alarm and warning alarm may have different rhythms.

(C) Automatic braking. When the degree of collision danger is level 3, and the distance between the vehicle and pedestrian C is shorter than z1, the control mode is "Automatic braking." When the control mode is "Automatic braking," automatic braking device 106 is controlled to forcibly brake the vehicle itself. That is, when there is a high danger of a collision with pedestrian C, there may be no time for the driver to perform the braking operation after hearing the caution or warning alarm. Consequently, automatic braking device 106 is in this case forcibly controlled to brake the vehicle to stop it. Also, a "warning" is issued while the control mode is "Automatic braking."

Figure 12A:
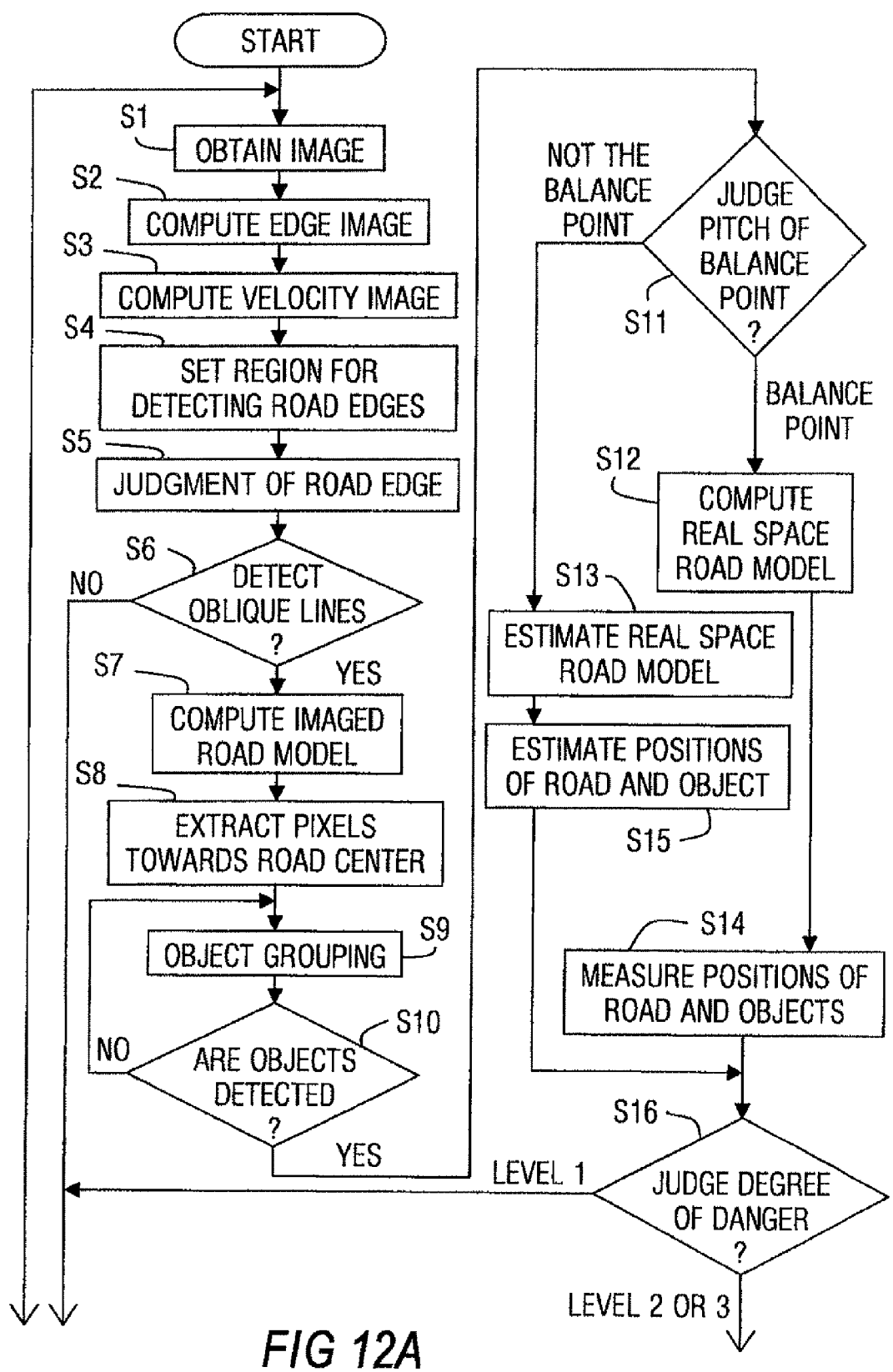
FIG. 12A is a flow chart of the operation of the object detection device shown in FIG. 1.
Figure 12B:
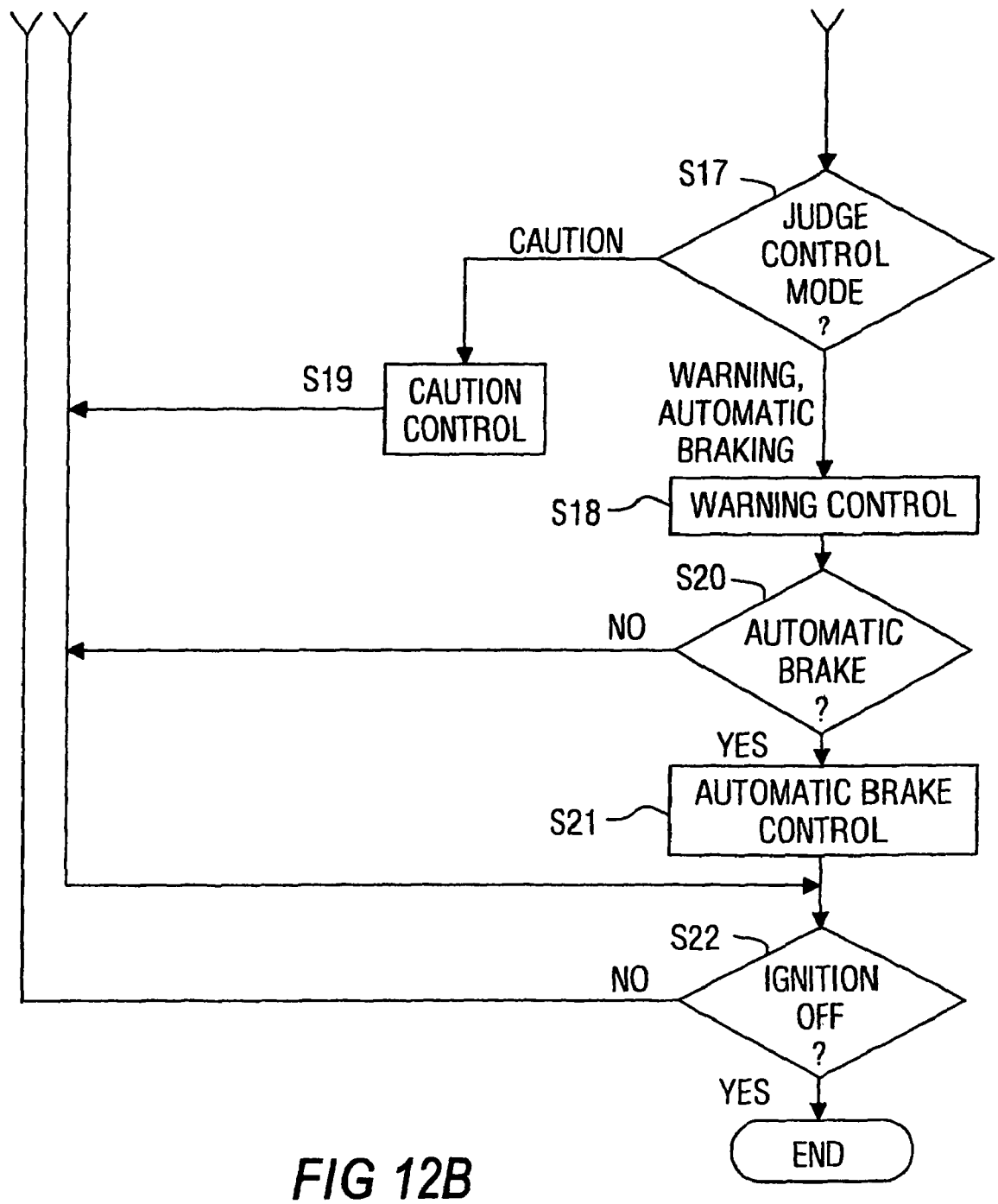
FIG. 12B is a continuation of the flow chart shown in FIG. 12A.

FIGS. 12A and 12B are a flow chart illustrating the processing performed by object detecting device 100 in the first embodiment. In the processing shown in FIG. 12A, the ignition switch of the vehicle is turned on. The power of object detecting device 100 is turned on, and the operation is executed by the program started by controller 103. In step S1, image 3a captured with camera 101 from in front of the vehicle is fetched from image memory 102. Then, process flow continues to step S2, and edge extraction processing is performed on image 3a to extract the contour of the object present in image 3a to generate an edge image. Process flow then proceeds to step S3. As explained above, in step S3 the edge velocity information for each pixel is computed, and the computed velocity information is transformed into a prescribed grade value to get the velocity image. Then, process flow continues to step S4.

In step S4, the region for detecting the boundary line in the computed velocity image is established, and process flow continues to step S5. In step S5, the oblique line is detected by judging whether the pixels having the velocity component in the region for detecting the boundary line are arranged side by side to form an oblique line. Then, process flow continues to step S6, and it is determined whether the oblique lines detected in the region for detecting the boundary line and forming a left/right pair have velocity components in the different directions that indicate they are the road edges. If it is determined that the detected oblique lines are not road edges, process flow continues to step S22, to be explained below. On the other hand, if it is determined that the detected oblique lines are the road edges, process flow continues to step S7.

In step S7, as explained above, the two-dimensional road model, that is, the imaged road model, is computed, and process flow continues to step S8. In step S8, the pixels having a velocity component towards the center of the two-dimensional road model are extracted. Then, process flow continues to step S9. Among the extracted pixels, the pixels having the same velocity component are grouped and the group is detected as an individual object. Process flow then proceeds to step S10. In step S10, grouping of the extracted pixels is completed, and a judgment is made as to whether all of the objects present in the velocity image have been detected. When it is judged that all of the objects present in the velocity image have been detected, process flow continues to step S11.

In step S11, a change in the velocity direction in the image of the oblique lines indicating the road edges is detected, and a judgment is made as to whether this is the pitching balance point. When it is judged to be the pitching balance point, process flow continues to step S12. In step S12, the positions of the oblique lines indicating the road edges are transformed to positions in real space, and the three dimensional road model is computed. Then, process flow continues to step S14, and the relative positional relationship between the road edge and the detected object in real space, that is, the distance between the road edge and the detected object and the distance between the vehicle and the detected object, is computed. Process flow then proceeds to step S16, as will be explained later.

On the other hand, when it is judged not to be the pitching balance point in step S11, process flow continues to step S13. In step S13, as explained above, based on the image pickup time interval between the velocity image at the pitching balance point and the current velocity image, the three dimensional road model is estimated, and process flow continues to step S15. In step S15, the relative positional relationship between the road edge and the detected object, that is, the distance between the road edge and the detected object and the distance between the vehicle and the detected object, is estimated, and process flow continues to step S16.

In step S16, based on the relative positional relationship between the road edge and the detected object, the degree of collision danger between the vehicle and the detected object is judged as one of the levels 1 3. If the degree of collision danger is judged to be level 1, no vehicle control to avoid collision is performed since there is no danger of collision between the vehicle and the detected object, and process flow continues to step S22, to be explained later. On the other hand, when it is judged that the degree of collision danger is level 2 or 3, process flow continues to step S17. In step S17, based on the distance between the vehicle and the detected object, the mode of vehicle control for avoiding collision is assessed.

When the control mode is the "Caution" mode, process flow continues to step S19. In this step, the caution alarm is output from speaker 105, and process flow then proceeds to step S22, to be explained later. On the other hand, when the control mode is "Warning" or "Automatic brake," process flow continues to step S18. In this step, a warning alarm is output from speaker 105, and process flow continues to step S20. In step S20, a judgment is made as to whether the control mode is "Automatic brake." If the control mode is not "Automatic brake," process flow continues to step S22, to be explained later. On the other hand, if the control mode is "Automatic brake," process flow continues to step S21.

In step S21, automatic braking device 106 is controlled to forcibly brake the vehicle. Then, process flow continues to step S22. In step S22, a judgment is made as to whether the ignition switch of the vehicle itself is OFF. If it is not OFF, flow returns to step S1, and the processing is repeated. On the other hand, if it is judged that the ignition switch of the vehicle itself is OFF, the processing comes to an end.

The following features and advantages can be realized in the first embodiment:

(1) The region for detecting the boundary lines is established in the computed velocity image on the basis of the image captured by camera 101. If the oblique lines detected in the region for detecting the boundary lines form a pair and have velocity components in different directions, it is determined that the left/right pair of oblique lines detected in the region for detecting the boundary lines are the boundary lines on the road, that is, the road edges. As a result, the road edges contained in the image captured by camera 101 have a linear component parallel to the optical axis, so that they can definitely be picked up as oblique lines on the image. In addition, taking into consideration the fact that a moving object can easily appear within the oblique lines, it is possible to detect the road edges with high accuracy.

(2) The point at which the velocity direction in the image of the oblique lines indicating road edges A and B changes is designated as the pitch balance point. As a result, by simply measuring the velocity direction of the oblique lines in the image, it is possible to detect the pitch balance point.

(3) On the basis of the coordinates of the representative points at road edges A and B at the pitch balance point and the camera parameters of camera 101, the three-dimensional coordinates of the representative points can be computed by means of triangulation. Also, at the pitch balance point, the camera parameters are in approximate agreement with those in the initial state of mounting, and the precision with which distance can be measured using a triangulation scheme is high. Taking this fact into consideration, it is possible to compute three-dimensional coordinates with great accuracy.

(4) On the basis of the relative positional relationship between road edges A and B and pedestrian C in real space, the degree of collision danger between the vehicle and pedestrian C can be assessed, and when the distance between the vehicle and pedestrian C is also taken into consideration, it is possible to control the vehicle to avoid a collision with pedestrian C. As a result, it is possible to make a correct judgment of the degree of danger, and it is possible to avoid a collision with pedestrian C.

Second Embodiment

In the second embodiment, not only the road edges present on both sides of the vehicle and detected in the first embodiment but also various types of boundary lines on the road, such as the boundary lines of multiple lane dividing lines on a multi-lane road or the boundary lines of road and buildings, are detected.

The block diagram shown in FIG. 1, the diagrams shown in FIGS. 2A and 2B for illustrating an arrangement example of camera 101 on a vehicle, and the diagrams shown in FIGS. 4A to 4C for illustrating an example of edge normalization are the same as in the first embodiment and will not be explained again. Calculation of the 2-dimensional road model on the basis of the detected road edges, detection of the object field including the object facing the center of the 2-dimensional road model, the judgment of the degree of risk on the basis of the positional relationship between the object and the boundary lines on the road transformed on the 3-dimensional road model, and the vehicle control or warning operation on the basis of the result of the degree of risk judgment explained on the basis of FIGS. 7-11 are also carried out in the same way as described in the first embodiment and will not be explained again.

Figure 13:
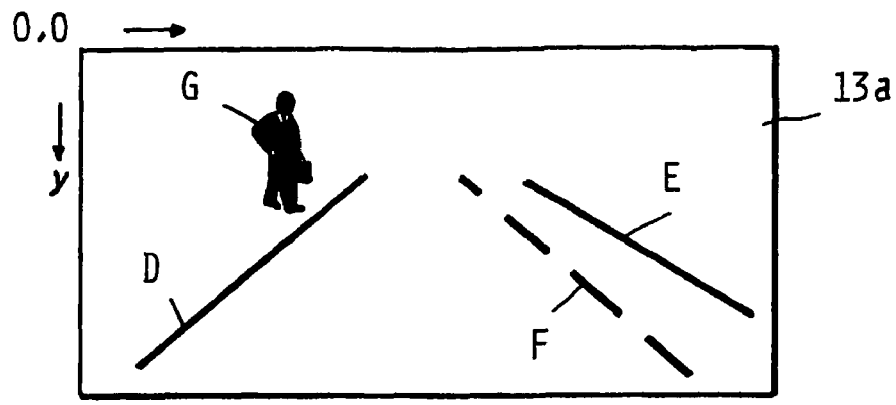
FIG. 13 is a diagram of an image captured by the camera shown in FIG. 2A, in accordance with a second embodiment of the invention.

FIG. 13 shows a detailed example of an image picked by camera 101 in the second embodiment. As in the first embodiment, image 13a is taken with the origin in the upper-left corner of the image and is represented with an xy coordinate system (camera coordinates) with the x-axis defined from left to right and the y-axis defined from top to bottom. In the example shown in FIG. 13, image 13a includes road edges D and E formed as lane markers, white lines or guardrails or the like positioned on the left/right sides of the road, boundary line F with the adjacent lane dividing line, and pedestrian G present in front of the vehicle.

Figure 14:
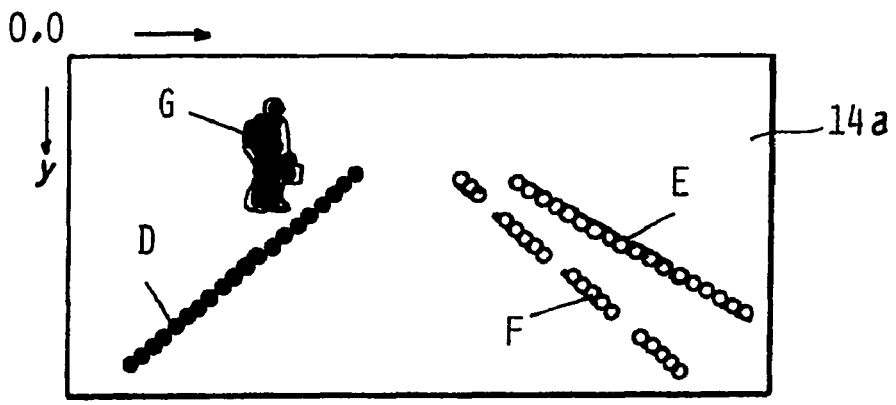
FIG. 14 is a diagram of the image shown in FIG. 13, illustrating a depiction of the velocity component.
Figure 15:
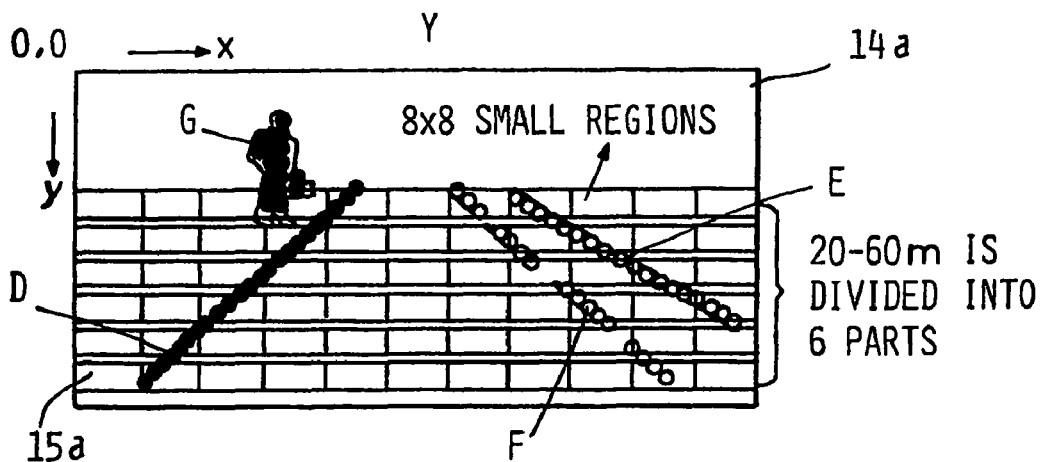
FIG. 15 is a diagram of the image shown in FIG. 13, illustrating the formation of regions for detecting boundary lines in the velocity image.

Velocity image 14a shown in FIG. 14 is formed by carrying out the same image processing as described in the first embodiment on image 13a shown in FIG. 13. Multiple regions for detecting boundary lines are formed by dividing a prescribed field in the velocity image 14a. In other words, as shown in FIG. 15, a prescribed field in front the vehicle, for example, a distance of 20-60 m from the vehicle in real space is divided into 6 parts having prescribed height in the vertical direction (y-axis direction) of the image. Each region divided in the vertical direction is divided at equal intervals in the horizontal direction of the image to form multiple regions 15a for detecting boundary lines in a field on the image corresponding to the prescribed field in front of the vehicle.

Each region 15a for detecting boundary lines formed as described above is further divided into small regions having a prescribed size. In this embodiment, for example, each region 15a for detecting boundary lines is equally divided into 64 small regions. In this way, each region 15a for detecting boundary lines is comprised of 8×8 small regions. The candidates for the boundary lines on the road present in velocity image 14a in each divided small region are detected.

As in the first embodiment, the road edges or other boundary lines on the road are detected as oblique lines in velocity image 14a. Taking this fact into account, the candidates for the oblique lines in each small region, that is, the candidates for the boundary lines on the road can be detected by detecting the pixels having parallel velocity components in the oblique direction to form the oblique lines in each small region.

First, any pixel present in each small region is taken as a target pixel. It is determined whether the target pixel constitutes an oblique line with the adjacent pixels in the oblique direction. In order to determine whether the target pixel and the adjacent pixels constituting a straight line obliquely have respective velocity components, for example, the spatial filter for detecting candidates for oblique lines shown in FIG. 16B is used on the target pixel. In this case, the spatial filter is applied such that the center 16a of the spatial filter matches the target pixel.

In velocity image 14a, the image of a boundary line on the road present on the right side of the vehicle is usually taken as an oblique line with a higher left end as shown by road edge E or boundary line F with the adjacent lane dividing line, and the image of a boundary line on the road present on the left side of the vehicle is usually taken as an oblique line with a higher right end as shown by road edge D. Therefore, a spatial filter used for detecting an oblique line with a higher left end, that is, the spatial filter shown in FIG. 16B is applied to the target pixel present in the right half of velocity image 14a, and a spatial filter used for detecting an oblique line with a higher right end, that is, a spatial filter obtained by reversing the spatial filter shown in FIG. 16B in the left and right direction is applied to a target pixel present in the left side of velocity image 14a.

If the result of applying a spatial filter to a target pixel shows that the target pixel and the pixel above it and/or the pixel below it in the oblique direction have their respective velocity components, that target pixel is detected as the candidate for a dot forming the oblique line, that is, as a dot candidate. This processing is carried out with respect to all of the pixels in the small region to detect all the dot candidates in the small region. If 3 or more dot candidates in a small region are side by side in the oblique direction to form an oblique line in that small region and these dot candidates satisfy the slope condition to be explained below, the straight line formed by connecting these dot candidates, that is, the oblique line, is detected as a candidate for a boundary line on the road (boundary line candidate).

In the following, the slope condition for detecting a boundary line candidate will be explained. In general, if there are multiple boundary lines on the road on the right or left side viewed from the vehicle in velocity image 14a, the slope of a boundary line close to the vehicle is larger than the slope of a boundary line away from the vehicle. In other words, a boundary line close to the vehicle has a larger angle formed with the x axis than a boundary line away from the vehicle. For example, in the example shown in FIG. 14, the slope of road edge E present on the right side of the vehicle is smaller than the slope of boundary line F with the adjacent lane dividing line.

Taking this fact into account, whether a straight line formed by connecting the dot candidates detected as described above is a boundary line candidate can be determined as follows. For example, as shown in FIG. 16A, when a straight line formed by connecting dot candidates is detected from small region 16b, it is determined whether straight lines formed by connecting dot candidates are detected from other small regions on the same side viewed from the vehicle and at the same height. If no straight line formed by connecting dot candidates is detected from other small regions on the same side viewed from the vehicle and at the same height as small region 16b, the straight line formed by connecting the dot candidates in small region 16b is detected as a boundary line candidate.

On the other hand, if a straight line formed by connecting dot candidates is detected from another region on the same side viewed from the vehicle and at the same height as small region 16b, such as, small region 16c, the slopes of the straight lines formed by connecting the dot candidates detected in these small regions are compared to determine whether the slope of the straight line close to the vehicle is larger than the slope of the straight line away from the vehicle. If the slope of the straight line close to the vehicle is larger than the slope of the straight line away from the vehicle, both are detected as boundary line candidates that constitute part of the boundary line on the road. On the other hand, if the slope of the straight line close to the vehicle is smaller than the slope of the straight line away from the vehicle, both are excluded as boundary line candidates.

The continuity of each of the detected boundary line candidates is judged as an oblique line in the vertical direction in velocity image 14a. If continuity is confirmed for multiple boundary line candidates, the straight line formed by connecting these boundary line candidates is detected as a boundary line on the road. In this way, as shown in FIG. 17, boundary lines D, E, and F on the road can be detected from velocity image 14a.

Figure 18A:
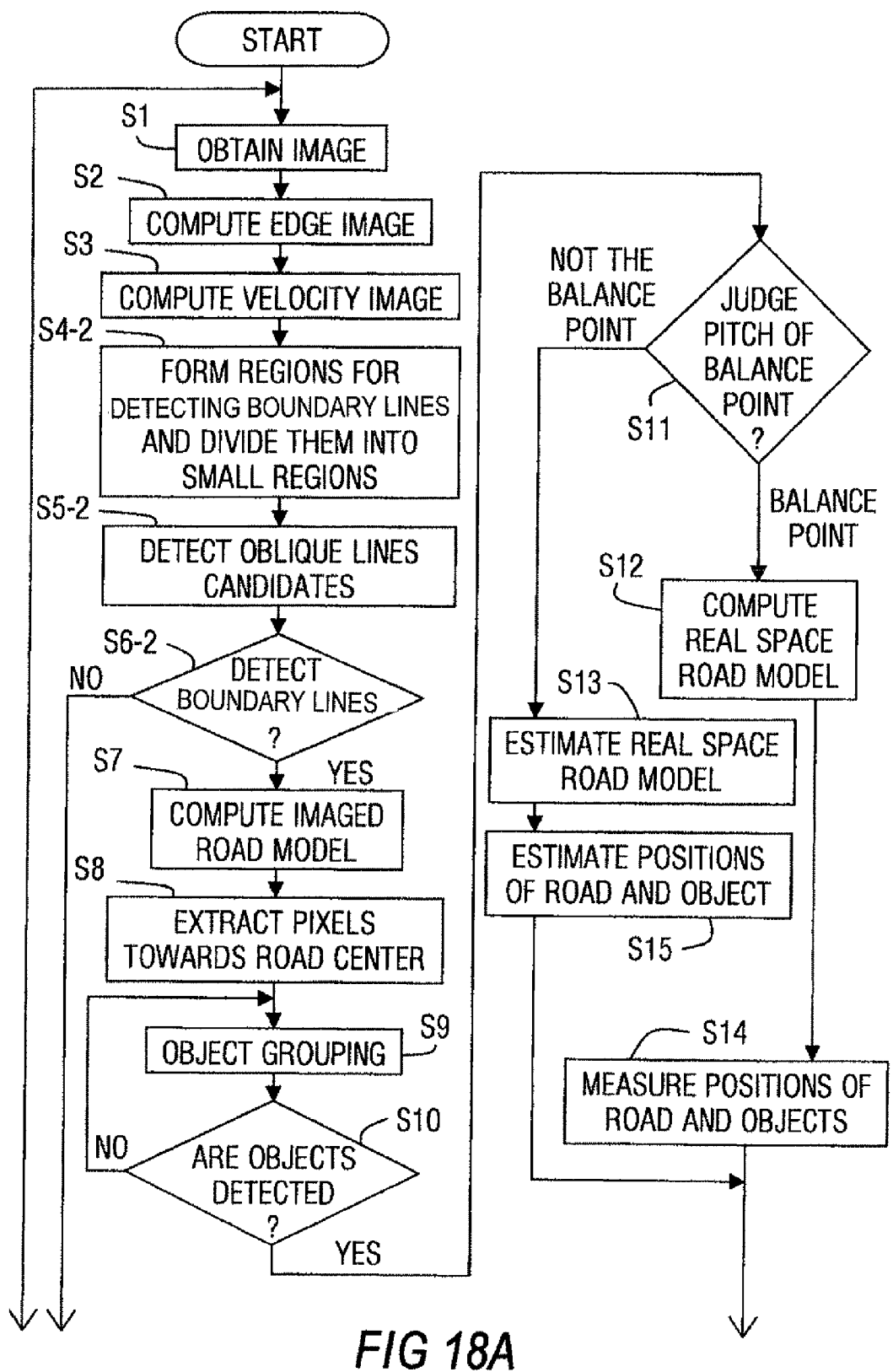
FIG. 18A is the flow chart illustrating the processing of object detecting device in accordance with the second embodiment of the invention.
Figure 18B:
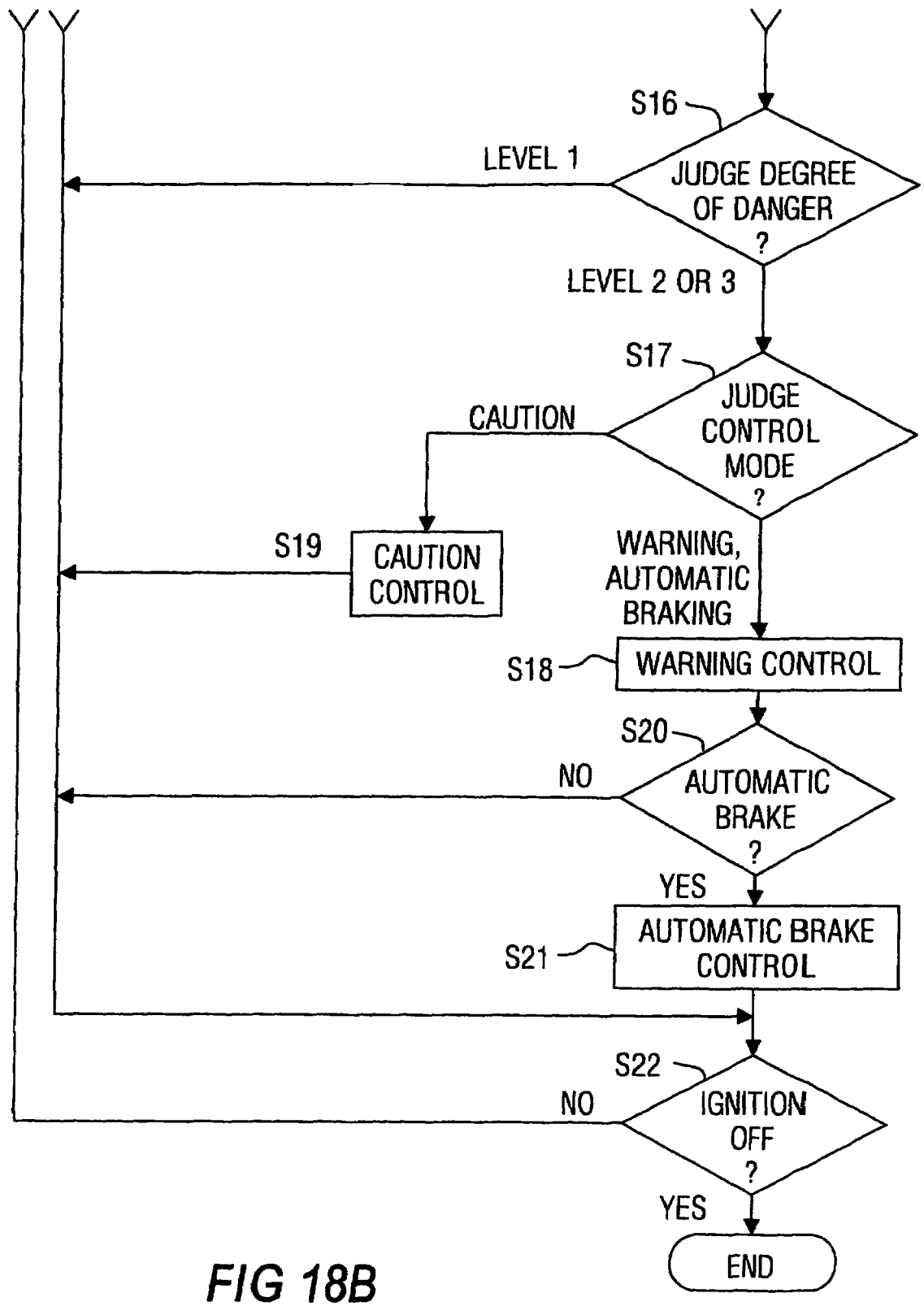
FIG. 18B is a continuation of the flow chart of FIG. 18A.

FIGS. 18A and 18B are a flow chart illustrating the processing of object detecting device 100 in the second embodiment. The processing is carried out as a program started by control device 103 when the ignition switch of the vehicle is turned on and the power object for detecting device 100 is turned on. In FIGS. 18A and 18B, the same step numbers are assigned to the same processes as those that are described in the first embodiment shown in FIGS. 12A and 12B, and the explanation focuses on the differences of these embodiments.

In step S4-2, multiple regions 15a for detecting a boundary line are set on velocity image 14a as described above, and each region 15a for detecting a boundary line is further divided into small regions with a prescribed size. Then, process control goes to step S5-2. The spatial filter shown in FIG. 16B is applied to the target pixel in each small region to detect the dot candidates. If 3 or more detected candidates are side by side in the oblique direction to form an oblique line in the small region and the straight line formed by connecting these dot candidates satisfies the slope condition, the straight line formed by connecting these dot candidates is detected as a boundary line candidate.

Process control then goes to step S6-2. The continuity of each of the boundary line candidates detected on velocity image 14a is judged as an oblique line in the vertical direction in velocity image 14a to determine whether the straight line formed by connecting these boundary line candidates is detected as a boundary line on the road. If a boundary line on the road is detected, process control goes to step S7. If no boundary line is detected, process control goes to step S22.

According to the second embodiment explained above, multiple regions for detecting a boundary line are formed in a prescribed field of velocity image 14a, for example, a distance of 20-60 m from the vehicle in real space. Candidates for the oblique lines are detected in each of the regions for detection of boundary lines, and the boundary lines on the road are detected. Consequently, in addition to the effects described in the first embodiment, in addition to the road edges present on both sides of the vehicle, various types of boundary lines on the road, such as the boundary lines of multiple lane dividing lines on a multi-lane road or the boundary lines of road and buildings, can also be detected.

Figure 19:
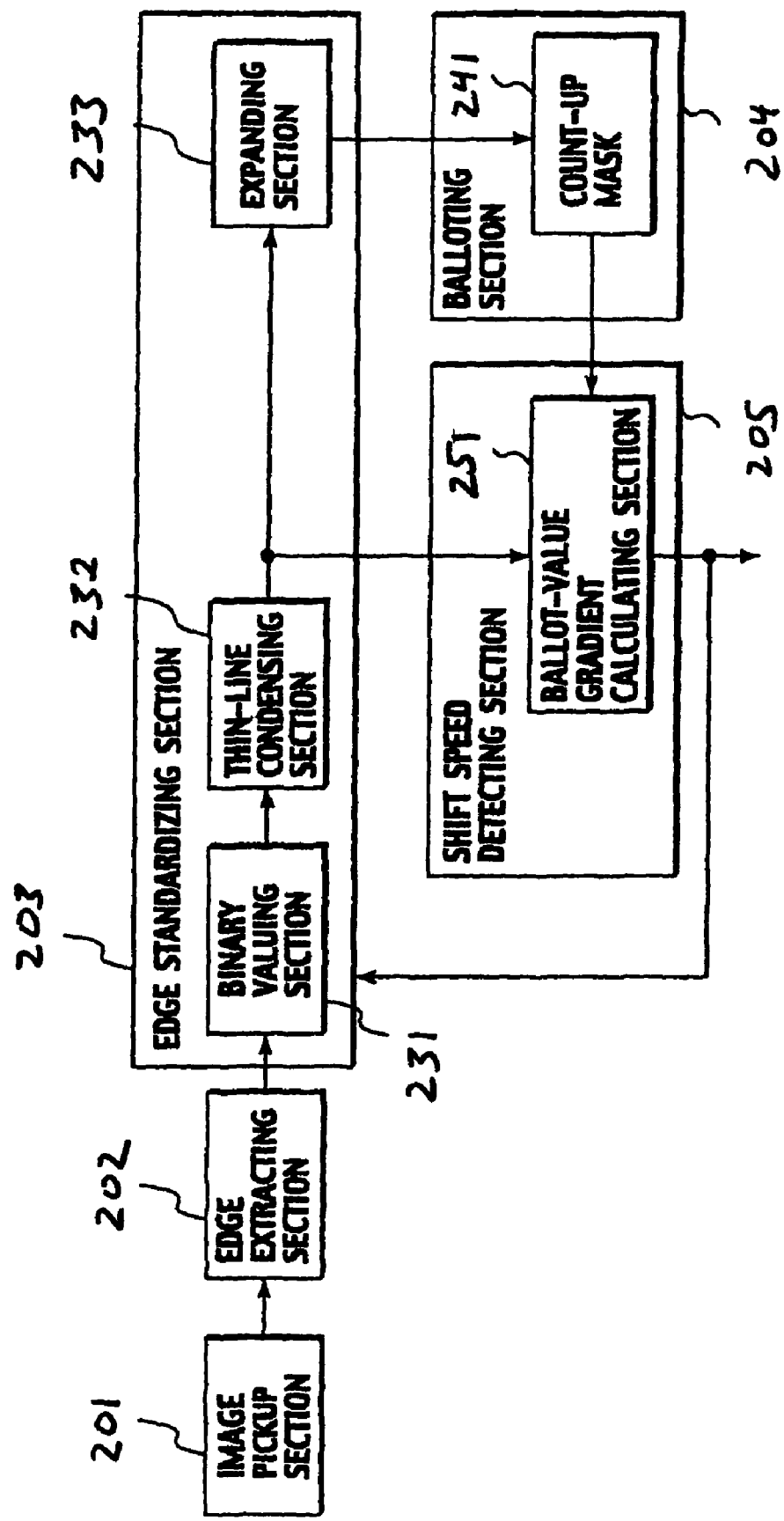
FIG. 19 is a block diagram showing a detailed structure an edge-width standardizing section.
Figure 20:
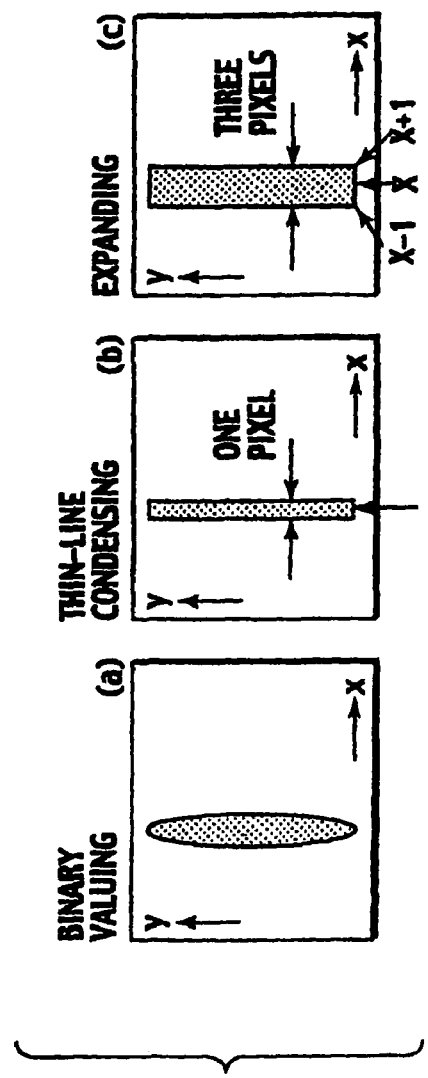
FIG. 20 is a view illustrating thin-line condensing operation and expanding operation by the edge-width standardizing section shown in FIG. 19.

Referring to FIGS. 19 and 20, an implementation of the processing performed to normalize the extracted edges to obtain an edge image as shown in FIGS. 4A to 4C is explained.

The edge extracting section 202 extracts an edge of an image using a SOBEL filter for the frame image inputted from the camera 101 as part of an image pickup section 201. The edge standardizing section 203 standardizes an edge width of the edge, extracted by the edge extracting section 202, to a given pixel number in a shift direction of the object.

Now, standardizing operation of the edge standardizing section 203 for the edge width is described in connection with FIGS. 19 and 20. As shown in FIG. 19, the edge-width standardizing section 203 is comprised of a binary valuing section 231 that allows the edge image, generated by the edge extracting section 202, to be valued in a binary state, a thin-line condensing section 232 that converts the edge width of the edge that is valued in the binary state by the binary valuing section 231 in a thin line to a given pixel number, and an expanding section 233 that expands the edge width of the edge, which is formed in the thin line by the thin-line condensing section 232, to a given pixel number.

With the edge standardizing section 203 configured in such a structure, if the edge image is inputted from the edge extracting section 202, the binary valuing section 231 executes a binary valuing operation on the edge image. During this binary valuing operation, a pixel of a pixel area whose edge is detected is allocated to take "1" while allocating a pixel of a pixel area whose edge is not detected to be "0", upon which a binary valued image is generated as shown in a frame image (a) in FIG. 20.

Next, the thin-line condensing section 232 executes a thin-line condensing operation for the binary valued image that is valued by the binary valuing section 231 in a binary state. The thin-line condensing operation is an operation in which the edge width of the detected edge is contracted to a given pixel number. With the frame image (b) shown in FIG. 20, the edge width of the edge is condensed to a given pixel number of one pixel. Upon condensing the line of the edge to the given pixel width in such a way, the thin-line condensing section 232 sets a center position to be a center of the edge.

Subsequently, the expanding section 233 executes an expanding operation for expanding the edge width of the edge whose line is condensed by the thin-line condensing section 232. During this expanding operation, the edge width is expanded in both shift directions of the edge, that is, in one shift direction away from a center position of the edge, set by the thin-line condensing operation, and in the other direction opposite to the one shift direction. With the frame image (c) in FIG. 20, the edge width is expanded in both directions by one pixel, i.e., in the shift direction (positively on the x-axis) away from the pixel position X, forming the center of the edge, and the other direction (negatively on the x-axis) opposite to the shift direction for thereby standardizing the edge width of the edge in three pixels with respect to the shift direction.

Upon executing the thin-line condensing and expanding operations in such a way, the edge-width standardizing section 203 standardizes the edge width of the edge, extracted by the edge extracting section 202, in a given pixel number toward the shift directions of the edge.

Here, although upon executing the thin-line condensing and expanding operations, the edge width is standardized, an alternative may be such that the edge extracting section 202 detects a peak position of the detected edge after which the edge width is standardized in a way to cause the edge width to have pixel widths each by a given pixel number in the shift direction of the edge and in the other direction opposite the shift direction with respect to the edge peak position.

Next, the balloting section 204 executes the operation to count up the standardized edges standardized in the way set forth above. This count-up operation is implemented such that values of memory addresses of memory regions whose standardized edges are detected are counted up while initializing the values of memory addresses of pixel areas whose standardized edges are not detected.

Now, the count-up operation of the balloting section 204 is described with reference to FIG. 21.

Figure 21:
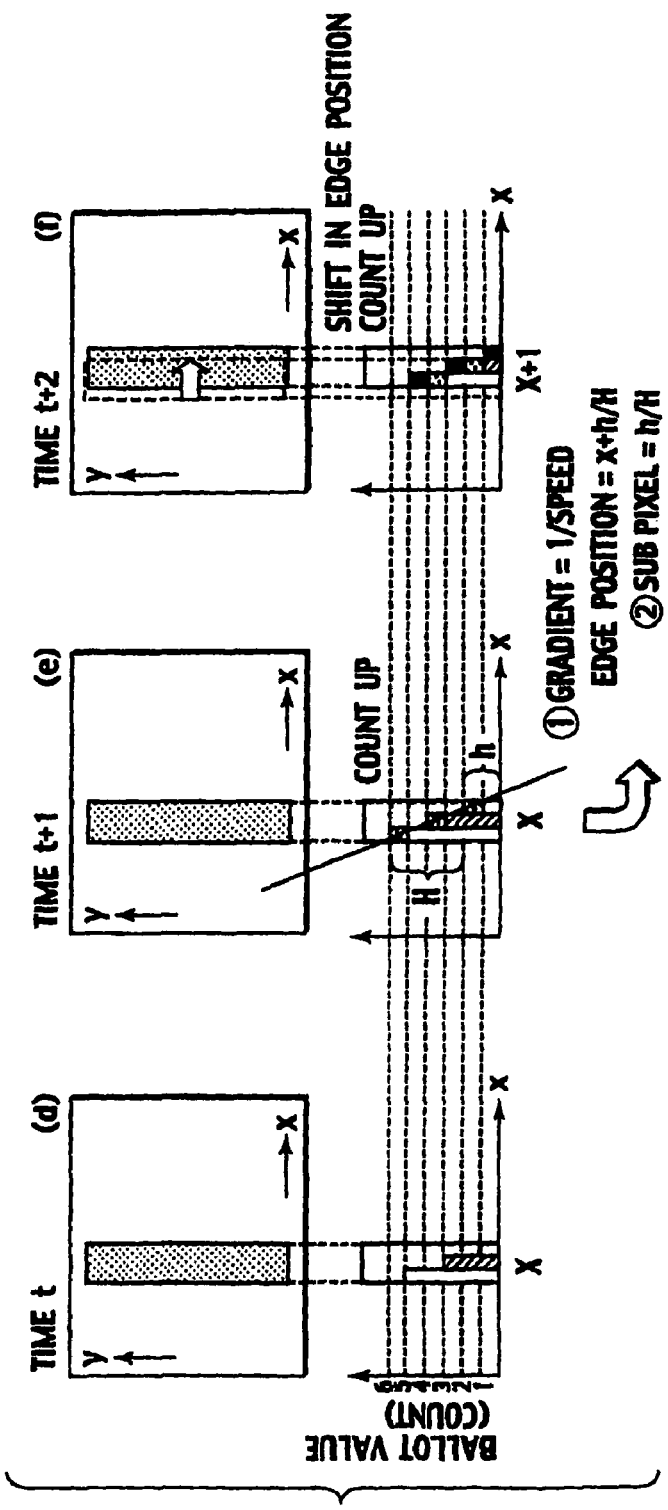
FIG. 21 is a view illustrating a count up operation of a balloting module.

As shown in FIG. 21, it is supposed that in a frame image (d) at time t, the edge width is expanded from a pixel position X−1 to the other pixel direction X+1 in both directions, including a shift direction of the edge and the other direction opposite to the shift direction, by one pixel, respectively.

In this case, the balloting section 204 counts up ballot values of the pixel positions X−1, X and X+1, whose standardized edges are detected by the count-up mask 141 one by one, and a ballot value of the pixel areas, whose standardized edges are not detected, is reset.

In a frame image (d) in FIG. 21, since the standardized edges are detected on the pixel positions X−1, X and X+1 at time t, the ballot values are counted up at the respective pixel positions one by one such that the pixel position X+1 takes the ballot value of 1, the pixel position X takes the ballot value of 3 and the pixel position X−1 takes the ballot value of 5.

No edge shifts at time t+1, the standardized edges are detected at the pixel positions X−1, X and X+1 and, as shown in the frame image (e) in FIG. 21, the ballot values of the pixel positions X−1, X and X+1 are further counted up one by one such that the pixel position X−1 takes the ballot value of 2, the pixel position X takes the ballot value of 4 and the pixel position X+1 takes the ballot value of 6.

Further, at time t+2, the edge shifts in a positive direction on the x-axis by one pixel upon which the standardized edges are detected at the pixel positions X, X+1 and X+2. Accordingly, the ballot values of the pixel positions X, X+1 and X+2, whose standardized edges are detected, are counted up, while resetting ballot value of the pixel area X−1 whose standardized edge is not detected. As a result, as shown by a frame image (f) in FIG. 21, the pixel position X+2 takes the ballot value of 1, the pixel position X+1 takes the ballot value of 3 and the pixel position X takes the ballot value of 5. In addition, the ballot value of the pixel position X−1, whose standardized edge is not detected, is reset to "0".

In such a way, the balloting section 204 counts up the ballot values of the pixel positions whose standardized edges are detected, while resetting ballot values of the pixel areas whose standardized edges are not detected.

While in FIG. 21 the ballot values are detected at a sum of three positions, i.e., the pixel positions X−1, X and X+1, as the pixel areas of the standardized edges, the ballot values of any positions may be detected provided that the gradient of the ballot values is obtained as will be described below.

Further, if the frame rate is set to be sufficiently higher than the speed in which the edge (at a central pixel position of the standardized edge) shifts, the standardized edges are detected a number of times on the same pixel areas for frame images successively appearing in time series. In case of FIG. 21, the standardized edge in the pixel position X is detected two times, at times t and t+1. Consequently, the ballot value resulting when the ballot values of the pixel areas whose standardized edges are detected is substantially equivalent to a time interval (frame number) during which the standardized edges are detected in the relevant pixel area. Particularly, this means how many number of frames are needed after the edge has shifted for the minimum ballot value h, among the ballot values of the pixel areas on which the standardized edges are located, to be located on the same pixel area.

Subsequently, the shift speed detecting section 205 calculates a shift speed, a shift direction and a position of the edge. The shift speed detecting section 205 initially calculates a gradient of the ballot values of the pixel areas of the standardized edges and, depending on the gradient of the ballot value, calculates the shift direction, the shift speed and the position of the edge.

Hereunder, this calculation method is described with reference to FIG. 21. In case of the frame image (e) in FIG. 21, the pixel positions X−1, X and X+1 have the ballot values of 6, 4 and 2, respectively. Therefore, upon subtracting the ballot value 2 at the pixel position X+1 from the ballot value 6 at the pixel position X−1, the gradient of the ballot value can be calculated as H=(6−2)/2=2. This means $H=\{$(Time Interval needed for Standardized Edge to shift from Pixel Position $X$−1 to Pixel Position $X$+1)$\}/$(2 Pixels)

Accordingly, the gradient H of the ballot values is substantially equivalent to the time interval (frame number) needed for the standardized edges to pass across the pixel position X. That is, the gradient H of the ballot values is equivalent to obtain information about how many number of frames are needed for the standardized edge to shift by one pixel and the shift speed 1/H of the edge can be calculated based on the gradient H of the ballot value.

In the frame image (e) in FIG. 21, four frames are needed for the standardized edge to shift by one pixel and, hence, the shift speed of the edge can be calculated to be ¼ (pixel/frame). Likewise, even in the frame image (f) in FIG. 21, the gradient of the ballot value is expressed as H=(5−1)/1=4 and, hence, the shift speed of the edge is expressed as ¼ (pixel/frame).

Further, the shift direction of the edge can be judged on a size of the ballot value. The pixel area, appearing when the edge shifts and a new standardized edge is detected, has a ballot value of 1 that forms a minimal value among the ballot values of the respective pixel positions. Consequently, the ballot value in a direction in which the edge shifts is small and the ballot value in a direction opposite to the direction in which the edge shifts is large, whereby it becomes possible to judge the shift direction of the edge.

In addition, if the frame rate is set to be sufficiently higher than the speed at which the edge shifts, it is assumed that the object is moving at a constant speed. Moreover, among the ballot values of the pixel areas on which the standardized edges are located, the minimal ballot value "h" means that the standardized edge is located on the same position for a time interval in which the standardized edge is detected at the relevant pixel position, that is, the given number of frames needed after the edge has shifted.

From the foregoing, suppose a center position of the edge is X, the position of the edge can be given as expressed below.

Current Position of Edge=$X+h/H$

In the frame image (e) in FIG. 21, since at time t+1 the edge is detected in the same pixel position two successive frames at the edge speed of ¼ (pixel/frame), the pixel position of the edge at time t+1 can be calculated to assume a position shifted from the pixel position by 2 (Frame)×{¼ (Pixel/Frame)}=0.5 Pixel Upon calculating the shift speed, the shift direction and the position of the edge in such a way, the shift speed detecting section 205 transmits the calculated shift speed to the edge standardizing section 203. Upon receipt of the shift speed, the edge standardizing section 203 alters the edge width of the edge to be standardized. In the frame image (f) in FIG. 21, although the edge width, subsequent to the standardizing operation, has three pixels with respect of the shift direction of the edge, the edge width with respect of the shift direction of the edge is altered to be greater than the three pixels when the received shift speed is high. When the shift speed is low, the edge width with respect of the shift direction of the edge is altered to be smaller than the three pixels.

Thus, altering the edge width for standardization enables the edge width to be standardized such that the standardized edges overlap one another between the frame images successive in time series in accordance with the shift speed, making it possible to expand a range of the shift speed available for detection.

As set forth above, the motion detection apparatus and motion detection method of the second embodiment have advantageous effects, in addition to those of the first embodiment, wherein the edge-width standardizing section 203 is structured to allow the standardized edge width to be altered depending on the shift speed calculated by the shift speed detecting section 205. Accordingly, even in the presence of variation in the shift speed of the object, the edge width can be standardized to allow the standardized edges to overlap one another between the successive frames, thereby expanding the range for the shift speed of the object available for detection.

Additional background information with respect to the edge extraction may be found in U.S. patent application Ser. No. 11/146,041 filed Jun. 7, 2005 and entitled "Motion Detection Apparatus and Motion Detection Method," which is hereby incorporated by reference in its entirety, and in Japanese Patent Applications Laid-open No. P2004-278250 with a filing data of Sep. 24, 2004 and Laid-open P2004-279394 with a filing data of Sep. 27, 2004, both of which are hereby incorporated by reference.

The following modifications may be made to object detecting device 100 in the embodiments.

(2) In the first and second embodiments, the grade values described with respect to FIG. 5 are adopted to compute velocity image 5a. However, the present invention is not limited to this scheme. For example, one may make adopt other grade values to compute the velocity image.

(3) In the first and second embodiments, object detecting device 100 of the present invention is mounted on a vehicle. However, the present invention is not limited to this scheme. For example, it can be mounted on other moving bodies.

(4) In the second embodiment, multiple regions for detecting boundary lines are formed in a prescribed field of velocity image 14a, for example, a distance of 20-60 m from the vehicle in real space. However, the present invention is not limited to this scheme. It is also possible to form the region for detecting boundary lines from the entire velocity image 14a or form regions for detecting boundary lines only in fields with a high probability of containing boundary lines on the road, such as a prescribed field to the left and right of velocity image 14a.

Also, the present invention is not limited to the embodiment, and modifications can be made as long as the essence of the present invention is observed.

In the following, the correspondence between the structural elements of the claims and the embodiments will be explained. The camera 101 corresponds to the image pickup means; speaker 105 and automatic braking device 106 correspond to the risk avoidance means; controller 103 corresponds to the velocity information computing means, pixel extracting means, oblique line detecting means, boundary line detecting means, balance point judgment means, object detecting means, transformation means, and degree of collision danger judgment means. Also, such correspondences are merely examples, and the correspondences can change depending on the constitution of the embodiment.

This application is based on Japanese Patent Application No. 2004-346670, filed Nov. 11, 2004 in the Japanese Patent Office, the entire contents of which are hereby incorporated by reference, and on Japanese Patent Application No. 2005-123494, filed Apr. 21, 2005, the entire contents of which are hereby incorporated by reference.

Also, the above-mentioned embodiments have been described in order to allow easy understanding of the present invention, and do not limit the present invention. On the contrary, the invention is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. An apparatus for detecting objects in one or more images captured by an image pickup device mounted on a vehicle, comprising:
   (a) memory on which is stored pixels of at least one image captured by the image pickup device; and
   (b) a controller operatively coupled to the memory and adapted to compute velocity information for each pixel in an image using a sequential series of images; extract from the image extracted pixels having a velocity component based on the velocity information, wherein the velocity component comprises a movement direction and a movement velocity in a lateral direction; define regions for detecting a road boundary; detect oblique lines made of pixels having a velocity component based on grouping those extracted pixels having a velocity component in the regions; and generate a signal indicative of a road boundary in the image based on the oblique lines.

2. The apparatus of claim 1, wherein the controller is further adapted to judge that oblique lines in the image are road boundaries when the vehicle is traveling and the oblique lines are positioned on the image with bilateral symmetry and respectively comprise pixels having velocity components with different movement directions.

3. The apparatus of claim 1, wherein the controller is further adapted to judge that oblique lines in the image are road boundaries when respective slopes of the oblique lines decrease from a center of the image toward an outside of the image.

4. The apparatus of claim 1, wherein the controller is further adapted to detect a change point where a velocity direction of a detected oblique line changes from one image to a subsequent image, and to judge that the change point is a pitching balance point where a line of sight orientation of the image pickup device is horizontal with respect to a road surface.

5. The apparatus of claim 1, wherein the controller is further adapted to identify a moving object that is approaching a predicted path of the vehicle by grouping those extracted pixels having a same velocity component with the movement direction being from a side toward the predicted path of the vehicle; and to generate a collision danger signal indicative of a risk of collision between the vehicle and the moving object.

6. The apparatus of claim 5, wherein the controller is further adapted to transform into a real space road model the oblique lines judged as the road boundary and the moving object and to determine the risk of collision between the vehicle and the moving object based on a relative positional relationship between the road boundary and the moving object as established in the real space road model.

7. The apparatus of claim 5, wherein the controller is further adapted to generate the collision danger signal at one of a plurality of values corresponding to collision risk levels.

8. The apparatus of claim 5, further comprising an audio alert operatively coupled to the controller and activated by the collision danger signal.

9. The apparatus of claim 5 further comprising an automatic braking device operatively coupled to the controller and activated by the collision danger signal.

10. A vehicle, comprising:
   (a) a camera mounted including an image-pickup element generating as output a plurality of images;
   (b) memory on which is stored the plurality of images generated by the image pickup element; and
   (c) a controller operatively coupled to the memory and adapted to compute velocity information for each pixel in an image using a sequential series of images; extract those pixels having a velocity component based on the velocity information, wherein the velocity component comprises a movement direction and a movement velocity in a lateral direction; define regions for detecting a road boundary; detect oblique lines based on grouping those extracted pixels having a velocity component in the regions; and generate a signal indicative of a road boundary in the image based on the oblique lines.

11. The vehicle of claim 10, wherein the controller is further adapted to judge that oblique lines in the image are road boundaries when the vehicle is traveling and the oblique lines are positioned on the image with bilateral symmetry and respectively comprise pixels having velocity components with different movement directions.

12. The vehicle of claim 10, wherein the controller is further adapted to judge that oblique lines in the image are road boundaries when respective slopes of the oblique lines decrease from a center of the image toward an outside of the image.

13. The vehicle of claim 10, wherein the controller is further adapted to detect a change point where a velocity direction of a detected oblique line changes from one image to a subsequent image, and to judge that the change point is a pitching balance point where a line of sight orientation of the camera is horizontal with respect to a road surface.

14. The vehicle of claim 10, wherein the controller is further adapted to identify a moving object that is approaching a predicted path of the vehicle by grouping those extracted pixels having a same velocity component with the movement direction being from a side toward the predicted path of the vehicle; and to generate a collision danger signal indicative of a risk of collision between the vehicle and the moving object.

15. The vehicle of claim 14, wherein the controller is further adapted to transform into a real space road model the oblique lines judged as the road boundary and the moving object, and to determine the risk of collision between the vehicle and the moving object based on a relative positional relationship between the road boundary and the moving object as established in the real space road model.

16. The vehicle of claim 14, wherein the controller is further adapted to generate the collision danger signal at one of a plurality of values corresponding to collision risk levels.

17. The vehicle of claim 14, further comprising an audio alert operatively coupled to the controller and activated by the collision danger signal.

18. The vehicle of claim 14, further comprising an automatic braking device operatively coupled to the controller and activated by the collision danger signal.

19. An apparatus for detecting objects in one or more images captured by an image pickup device mounted on a vehicle and traveling on a road, comprising:
(a) velocity information computing means for processing a sequential series of images to compute velocity information for each pixel in an image;
(b) pixel extracting means for extracting pixels having a velocity component based on the velocity information computed by the velocity information computing means, wherein the velocity component comprises a movement direction and a movement velocity in a lateral direction;
(c) defining means for defining regions for detecting a road boundary;
(d) oblique line detecting means for detecting oblique lines made of pixels having a velocity component and extracted by the pixel extracting means by grouping those extracted pixels having the velocity component in the regions; and
(e) boundary line detecting means for detecting at least one boundary line on the road present in the image on the basis of the oblique line detected by the oblique line detecting means.

20. The apparatus of claim 19, wherein the boundary line detecting means judges that the oblique lines are road boundaries when the vehicle is traveling and the oblique lines detected by the oblique line detecting means are positioned with bilateral symmetry on the images and respectively comprise pixels having velocity components with different movement directions.

21. The apparatus of claim 19, wherein when multiple oblique lines are detected by the oblique line detecting means, the boundary line detecting means detects the oblique lines as boundary lines on the road when respective slopes of the oblique lines decrease from a center of the image in front of the vehicle toward an outside of the image.

22. The apparatus of claim 19, further comprising balance point judgment means for detecting a change point where a velocity direction of a detected oblique line detected by the oblique line detecting means changes from one image to a subsequent image, and judging that the change point is a pitching balance point where a line of sight orientation of the image pickup device is horizontal with respect to a road surface.

23. The apparatus of claim 22, further comprising:
object detecting means for grouping those pixels extracted by the pixel extracting means having a same velocity component with the movement direction being from a side toward a predicted movement path of the vehicle, and detecting moving objects that approach the predicted movement path of the vehicle;
transformation means for transforming the oblique lines judged as the boundary lines on the road by the boundary line detecting means and the moving object detected by the object detecting means into a real space road model; and
degree of collision danger judgment means for accessing a degree of collision danger between the vehicle and the moving body on the basis of a relative positional relationship between the boundary lines on the road together with the moving object established in the real space road model by the transformation means.

24. The apparatus of claim 23, wherein:
the degree of collision danger judgment means classifies the degree of collision danger between the vehicle and the moving object into multiple risk levels and makes a judgment according to a degree of risk based on the multiple risk levels; and
further comprising risk avoidance means for controlling the vehicle to avoid a collision between the vehicle and the moving object according to the degree of risk assessed by the degree of collision danger judgment means.

25. A method for detecting objects in an image captured of the pathway of a vehicle, comprising:
(a) computing velocity information for each pixel in the image using a sequential series of images;
(b) extracting from the image extracted pixels having a velocity component based on the velocity information, wherein the velocity component comprises a movement direction and a movement velocity in a lateral direction;
(c) defining regions for detecting a road boundary;

(d) detecting oblique lines made of pixels having a velocity component by grouping the extracted pixels having a velocity component in the regions; and (e) detecting one or more boundary lines on the vehicle pathway in the image from the oblique lines.

26. The method of claim 25, wherein detecting one or more boundary lines comprises judging that the oblique lines are road boundaries when the vehicle is traveling and the oblique lines are positioned with bilateral symmetry on the images and each oblique line comprises pixels having velocity components with a movement direction different from a movement direction of pixels of the other oblique line.

27. The method of claim 25, wherein multiple oblique lines are detected as the boundary lines on the vehicle pathway when respective slopes of the oblique lines decrease from a center of the image in front of the vehicle toward an outside of the image.

28. The method of claim 25, further comprising:

detecting a change point where a velocity direction of an oblique line detected by the oblique line detecting means changes from one image to a subsequent image, and judging that the change point is a pitching balance point where a line of sight orientation of an image pickup device is horizontal with respect to a road surface.

29. The method of claim 25, further comprising:

grouping the pixels having movement directions from a side toward a predicted movement path of the vehicle from among the extracted pixels, and detecting a moving object that approaches the predicted movement path ahead of the vehicle where a group of pixels has a same velocity component;

transforming into a real space road model the oblique lines judged as the boundary lines on the road and the moving object; and accessing a degree of collision danger between the vehicle and the moving object on the basis of a relative positional relationship between the boundary lines on the road and the moving object established in the real space road model.

30. The method of claim 29, further comprising:

classifying the degree of collision danger between the vehicle and the moving object into one of a plurality of risk levels and making a collision danger judgment according to the classified degree; and generating a signal to control the vehicle to avoid a collision between the vehicle and the moving object according to the collision danger judgment.

* * * * *